(12) United States Patent
Galli et al.

(10) Patent No.: US 8,641,992 B2
(45) Date of Patent: Feb. 4, 2014

(54) PROCESS FOR RECOVERING LITHIUM FROM A BRINE

(75) Inventors: Daniel Ernesto Galli, San Salvador de Jujuy (AR); Demetrio Humana, San Salvador de Jujuy (AR); Maria de las Mercedes Otaiza, San Salvador de Jujuy (AR); Claudia del Rosario Cachagua, San Salvador de Jujuy (AR); Rene Enrique Santillan, San Salvador de Jujuy (AR)

(73) Assignee: ADY Resources Limited, Sydney (AU)

( * ) Notice: Subject to any disclaimer, the term of this patent is extended or adjusted under 35 U.S.C. 154(b) by 170 days.

(21) Appl. No.: 13/002,591

(22) PCT Filed: Jul. 15, 2009

(86) PCT No.: PCT/AU2009/000903
§ 371 (c)(1),
(2), (4) Date: Mar. 25, 2011

(87) PCT Pub. No.: WO2010/006366
PCT Pub. Date: Jan. 21, 2010

(65) Prior Publication Data
US 2011/0300041 A1    Dec. 8, 2011

(30) Foreign Application Priority Data
Jul. 18, 2008    (AU) ................................ 2008903688

(51) Int. Cl.
*C01D 15/00*    (2006.01)
(52) U.S. Cl.
USPC ...................... 423/179.5; 423/421; 423/499.3

(58) Field of Classification Search
USPC .................... 423/179.5, 421, 499.3
See application file for complete search history.

(56) References Cited

U.S. PATENT DOCUMENTS

| | | |
|---|---|---|
| 4,036,713 A | 7/1977 | Brown |
| 4,126,666 A | 11/1978 | Jacob et al. |
| 4,207,297 A | 6/1980 | Brown et al. |
| 4,251,338 A | 2/1981 | Retallack |
| 4,261,960 A | 4/1981 | Boryta |
| 4,271,131 A | 6/1981 | Brown et al. |
| 4,980,136 A | 12/1990 | Brown et al. |

(Continued)

FOREIGN PATENT DOCUMENTS

| | | |
|---|---|---|
| EP | 1681263 | 7/2006 |
| EP | 1803449 | 7/2007 |
| WO | WO99/29624 | 6/1999 |
| WO | WO 2009/131628 | 10/2009 |

OTHER PUBLICATIONS

Ashland Praestol: Flocculants for all Applications involving Solid/Liquid Separation, Mar. 2008, vol. 2.

(Continued)

*Primary Examiner* — Melvin C Mayes
*Assistant Examiner* — Melissa Stalder
(74) *Attorney, Agent, or Firm* — Barnes & Thornburg LLP

(57) ABSTRACT

There is disclosed herein a process for recovering lithium from an impure natural or industrial brine, the process comprising adjusting the pH of a feed brine containing lithium to a value of no less than 11.3 and separating the waste solids and a solution containing lithium values. The solution may be further concentrated and treated to obtain lithium carbonate and a lithium chloride solution suitable for obtaining electrolytic grade lithium chloride.

21 Claims, 8 Drawing Sheets

(56) References Cited

U.S. PATENT DOCUMENTS

| | | |
|---|---|---|
| 5,219,550 A | 6/1993 | Brown et al. |
| 5,993,759 A * | 11/1999 | Wilkomirsky ............ 423/179.5 |
| 6,048,507 A | 4/2000 | Amouzegar et al. |
| 6,143,260 A | 11/2000 | Boryta |
| 6,365,196 B1 | 4/2002 | Venkatesh et al. |
| 6,608,008 B1 | 8/2003 | Smith |
| 6,908,570 B2 | 6/2005 | Green |
| 7,214,355 B2 | 5/2007 | Boryta et al. |
| 2003/0228251 A1 | 12/2003 | Boryta et al. |
| 2006/0115396 A1 | 6/2006 | Boryta et al. |

OTHER PUBLICATIONS http://en.wikipedia.org/w/index.php?title= Flocculation Jun. 12, 2008.

Newbury Praestol 2515 Datasheet.

International Preliminary Report on Patentability and International Search Report for PCT/AU2009/000903 dated Oct. 13, 2010.

* cited by examiner

PROCESS FOR RECOVERING LITHIUM FROM A BRINE

CROSS-REFERENCE TO RELATED APPLICATIONS

This application is a U.S. national counterpart application of International Application Serial No. PCT/AU2009/000903, filed Jul. 15, 2009, which claims priority to Australian Patent Application No. 2008903688, filed Jul. 18, 2008. The disclosures of both PCT/AU2009/000903 and AU2008903688 are hereby incorporated herein by reference.

FIELD OF THE INVENTION

The present invention relates to a method for recovering lithium from a brine. Particularly, the present invention relates to a method for recovering lithium values and lithium salt(s) from a brine.

BACKGROUND OF THE INVENTION

There are a significant number of commercial applications for lithium and lithium minerals and lithium salts (including the carbonate, hydroxide and halogenide salts) in various industries such as in the electronic, pharmaceutical, ceramic and lubricant industries, among others. Commercial applications include, but are not limited to, use in lithium batteries and reversible lithium ion batteries, use in lubricant greases, use as catalyst in the manufacture of synthetic rubber, use in the manufacture of glass and ceramics, use in the manufacture of television tubes, use in obtaining metal lithium, use as an air purifier in ventilation systems, use as a component of the electrolyte of accumulators used in submarines and telephone installations, use in power supplies for trains and telephones, use as starting material to obtain the isotope $Li^6$, use in the control of gas moisture and air conditioning, use in heat absorption pumps, use in special welding and other fluxes, use in aluminum metallurgy and in the steel industry (for example for continuous casting and as cleaner/degreaser), use in the sterilization of water for swimming pools, and use in organic chemical synthesis as a reducing agent.

The key to performance of lithium and lithium compounds resides in obtaining high purity lithium metal or lithium compounds by minimizing impurities such as sodium, calcium and magnesium, carbonates, sulphates and borates that, while they do not significantly affect the purity of the lithium metal/compound produced, may impair performance.

Given the importance of lithium and its compounds, it is highly desirable to have a low impurity lithium source, and an economically viable method for the production of lithium and its compounds.

In this regard, a substantial portion of the lithium available at present is recovered from brines, which also contain high levels of sodium, making the production of lithium salts with low levels of sodium difficult and expensive.

Natural brines that contain lithium have many impurities as shown in Table 1 below.

TABLE 1

Composition of natural brines expressed by weight percent.

| Element | Ocean | Great Salt Lake Brine Utah | Salton Sea Brine California | Silver Peak Brine Nevada | Salar de Atacama Brine Chile | |
|---|---|---|---|---|---|---|
| $Na^+$ | 1.05 | 7.0 | 5.71 | 6.2 | 7.17 | 5.70 |
| $K^+$ | 0.038 | 0.4 | 1.42 | 0.8 | 1.85 | 1.71 |
| $Mg^{++}$ | 0.123 | 0.8 | 0.028 | 0.02 | 0.96 | 1.37 |
| $Li^+$ | 0.0001 | 0.006 | 0.022 | 0.02 | 0.15 | 0.193 |
| $Ca^{++}$ | 0.04 | 1.5 | 0.0 | 0.71 | 1.46 | 0.043 |
| $Cl^-$ | 1.9 | 14.0 | 15.06 | 10.06 | 16.04 | 17.07 |
| $Br^-$ | 0.0065 | 0.0 | 0.0 | 0.002 | 0.005 | 0.005 |
| B | 0.0004 | 0.007 | 0.039 | 0.005 | 0.04 | 0.04 |
| $Li^+/Mg^{++}$ | 0.0008 | 0.0075 | 0.786 | 1.0 | 0.156 | 0.141 |
| $Li^+/K^+$ | 0.0026 | 0.015 | 0.0155 | 0.016 | 0.081 | 0.113 |
| $Li^+/Ca^{++}$ | 0.0025 | 0.2 | 0.0008 | 1.0 | 4.84 | 0.244 |
| $Li^+/B$ | 0.25 | 0.857 | 0.051 | 4.0 | 3.75 | 4.83 |

Brine sources of lithium include the salars (brine deposits) in the Andes Mountains of South America which contain significant deposits of lithium salts; these include the Salar de Atacama, Chile, Salar de Uyuni, Bolivia, and Salar de Rincón, Province of Salta, Argentina.

Salars in the Andes Mountains are large, dry lakebeds where the brines are located just under a layer of crusted salt deposits. These types of deposits provide a viable source of concentrated natural brines which can potentially be treated to produce purified lithium salts, provided that impurities contained are in a ratio that allows the operation to be economically viable.

In these natural brines containing lithium, the impurities of the matrix, such as magnesium, calcium, sodium, sulphate and boron, must be minimized to obtain a lithium saline product suitable for a given use.

Alkaline metals, such as sodium, and alkaline earth metals, such as calcium and especially magnesium, must be substantially removed. To date, technical procedures to remove these impurities are not profitable.

The individual applications require that these ionic impurities are reduced to maximum specific levels and a number of processes have been described to remove such impurities.

For example, U.S. Pat. No. 4,207,297 describes an integrated continuous process for producing lithium hydroxide monohydrate and high purity lithium carbonate with a high average particle size, that comprises: converting technical grade impure lithium carbonate into lithium hydroxide by an alkalization step with a suspension of calcium hydroxide, separating the precipitated calcium carbonate of the resulting lithium hydroxide solution, dividing the resulting lithium hydroxide solution in two: a major portion and a minor portion at a ratio of volume of the major portion to the minor portion from about 10:1 to about 2:1, precipitating lithium hydroxide monohydrate from the major portion of the solution of lithium hydroxide and recovering the same, introducing carbon dioxide or lithium carbonate to the minor portion of the solution of lithium hydroxide for the additional precipitation of calcium as calcium carbonate, separating the calcium carbonate from the solution of lithium hydroxide, introducing carbon dioxide to the solution of lithium hydroxide to precipitate high purity lithium carbonate with high average particle size, separating the lithium carbonate from the resulting solution of diluted lithium carbonate and recycling the diluted solution of lithium carbonate to the step of alkalization This process is hampered by extremely slow filtration, and is unsuitable for commercial practice.

U.S. Pat. No. 4,980,136 discloses a process for producing lithium chloride of a purity higher than 99%, and substantially free from boron, from a natural or waste brine of other processes that contains a sufficient amount of lithium substantially free from sulphate. This process comprises following the steps of contacting the brine containing lithium chloride that comprises from 2% to 7% by weight of lithium obtained by solar evaporation, by heating or any other conventional means, and being saturated with hydrated metal salts present in the brine and substantially free from free water, with an organic solution comprising from 5% to 40% by volume of a fatty alcohol that contains from 6 to 16 carbon atoms in kerosene in a volume ratio of organic solution to brine that ranges from about 1:1 to 5:1 to extract the boron from the brine to the phase of the organic solution; separating the phase of organic solution from the brine; evaporating the aqueous phase to a temperature higher than about 100.5° C. under vacuum of about 590 mm Hg to about 760 mm Hg to crystallize anhydrous lithium chloride; and separating the anhydrous lithium chloride from the remaining aqueous phase. Optionally, this process is followed by washing and/or extraction with a low molecular weight alcohol of the resulting lithium chloride to remove any residual boron together with other contaminants present below 1% in the lithium chloride, the lithium chloride being solubilised into the alcoholic solution. The alcohol solution containing lithium chloride is then filtered and evaporated to form lithium chloride crystals with a high purity of greater than 99.9%. The obtained anhydrous lithium chloride is particularly useful for producing lithium metal by electrolysis.

This process comprises extraction steps using a mixture of alcohol-kerosene solvents that are potentially not economically viable at the required industrial scale, even before considering the negative impact on the environment due to the use of alcohol-kerosene solvents.

U.S. Pat. No. 5,219,550 describes a process to produce lithium carbonate with a low content of boron from a natural brine containing lithium, comprising the steps of: contacting a brine containing lithium substantially free from sulphate, that has a lithium content from about 2% to about 7% by weight obtained by solar evaporation or other conventional means, the brine being saturated with hydrated metal salts present in the same and substantially free from free water, having a pH that ranges from about 1-2 measured when diluted with 10 volumes of water, with an organic solution comprising from about 5% to about 50% by volume of a fatty alcohol containing from 6 to 16 carbon atoms in kerosene in a volume ratio of organic solution to brine ranging from about 1:1 to 5:1, to extract the boron of the brine to the organic phase; separating the organic solution phase from the brine; removing magnesium and calcium from the brine by conventional means; adding sodium carbonate to precipitate the lithium carbonate from the brine; and separating the lithium carbonate resulting from the same. The lithium carbonate obtained is particularly useful for conversion thereof into high purity lithium chloride for the production of metal lithium by electrolysis.

This process involves multiple steps utilizing extraction with solvents and is not viable at industrial scale. It also has a negative impact on the environment.

As can be seen from the references described above, a significant research and development effort has been invested in the search for an economic means of industrial-scale exploitation of brine containing lithium and to produce lithium salts such as chloride and carbonate salts of sufficient purity to produce high-purity lithium metal.

To date, however, a process that allows treating a brine in an aqueous medium for obtaining high purity lithium carbonate without the use of extraction solvents, and easy to implement near salars has not been disclosed. Therefore, there remains a need for providing such a process.

OBJECT OF THE INVENTION

It is an object of the present invention to substantially overcome or at least ameliorate one or more of the above disadvantages or at least provide a suitable alternative.

SUMMARY OF THE INVENTION

According to a first aspect of the present invention, there is provided a process for recovering lithium from an impure natural or industrial brine, the process comprising (a1) adjusting the pH of a feed brine containing lithium to a value of no less than 11.3 and separating the waste solids and a slurry containing lithium values.

In one embodiment the pH is adjusted to a value of no less than 11.4. In another embodiment the pH is adjusted to no less than 11.5. In another embodiment the pH is adjusted to a value of no less than 11.6.

In one embodiment the pH is adjusted by the addition of an aqueous basic slurry or aqueous basic solution. In one embodiment, the pH is adjusted by the addition of one or more of calcium hydroxide, lime (CaO) or slaked lime (Ca(OH)$_2$). In one embodiment, the pH is adjusted by addition of an aqueous mixture containing from about 1% to about 20 wt % by weight of calcium hydroxide or containing from about 5% to about 10% by weight of calcium hydroxide or containing about 7.5% by weight of calcium hydroxide. In one embodiment the calcium hydroxide is prepared using the naturally occurring brine.

In one embodiment, the pH is adjusted to a value of no less than 11.3 by addition of alkaline metal hydroxide. In one embodiment the alkaline metal hydroxide is selected from lithium hydroxide, sodium hydroxide, potassium hydroxide, or mixtures thereof. In one embodiment the alkaline metal hydroxide is sodium hydroxide. In another embodiment the pH is adjusted by the addition of a soluble carbonate. In one embodiment the soluble carbonate is selected from lithium carbonate, sodium carbonate, potassium carbonate, or mixtures thereof. In another embodiment any of the above compounds may be added in the form of an aqueous solution. In another embodiment the pH is adjusted to a value of no less than 11.3 by electrolysis of an impure brine. In another embodiment the treatment with ionic exchange resins reduces the content of some ions, such as impurities as $Mg^{++}$. In another embodiment the ionic exchange resin is a basic ionic exchange resin.

In one embodiment the step a1) may comprise the sub-steps of:

a1.1) adding lime, slaked lime and/or calcium hydroxide to the solution of feed brine taking the pH to a value of no less than 11.3 precipitating a waste solid and forming a slurry containing lithium values in its liquid phase;

a1.2) if necessary, adjusting the concentration of $Ca^{2+}$ in the slurry;

a1.3) additionally, if necessary, adjusting the pH of the slurry to a value of no less than 11.3 by adding an effective amount of an aqueous basic solution;

a1.4) optionally, adding a flocculant solution to the slurry to aid in the separation of waste solids from the processed brine solution; and a1.5) separating the waste solids precipitated from the slurry to form a processed brine solution and a waste slurry.

In one embodiment when separating the waste solid in sub-step a1.1) the concentration in the slurry of:
magnesium is reduced to less than 5 mg/l by precipitating as $Mg(OH)_2$;
sulphate ($SO_4^{2-}$) is reduced by precipitating as $CaSO_4 \cdot 2H_2O$;
boron is reduced by precipitating as $CaB_2O_4 \cdot 6H_2O$ and $2CaO \cdot 3B_2O_3 \cdot 13H_2O$;
bicarbonate ($HCO_3^-$) and carbonate ($CO_3^{2-}$) is reduced by precipitating as $CaCO_3$.

In one embodiment in sub-step a1.2 the concentration of $Ca^{2+}$ is decreased. In another embodiment the concentration of $Ca^{2+}$ is increased. The concentration of $Ca^{2+}$ may be decreased by the addition of a neutral alkaline sulphate, for example by addition of lithium sulphate, sodium sulphate, potassium sulphate or mixtures thereof. In one embodiment the concentration of $Ca^{2+}$ is adjusted so as to precipitate $CaSO_4$. The concentration of $Ca^{2+}$ may be increased by the addition of a neutral calcium salt such as calcium chloride. In one embodiment the concentration of ions $Ca^{2+}$ in step a1.2 induces the precipitation of any remaining boron, sulphate and carbonate. In one embodiment the precipitation of remaining boron, sulphate and carbonate occurs during a concentration by evaporation of the brine following sub-step a1.1).

In one embodiment, an aqueous basic solution is used in sub-step a1.3) to adjust the pH and in one embodiment is prepared using an alkaline metal hydroxide. In one embodiment the pH is adjusted in sub-step a1.3 by addition of an alkaline metal hydroxide selected from lithium hydroxide, sodium hydroxide, potassium hydroxide, or mixtures thereof. In one embodiment the alkaline metal hydroxide is sodium hydroxide.

In one embodiment the pH is adjusted so as to maintain any $Mg(OH)_2$ precipitated in (a1) insoluble.

In one embodiment in sub-step a1.4) the flocculant is a polymeric flocculant. In one embodiment the polymeric flocculant is an anionic polymeric flocculant. In one embodiment the anionic polymer flocculant is a water-soluble vinyl copolymer of acrylamide or methacrylamide. In another embodiment, the flocculant is a copolymer of acrylamide and sodium acrylate. In one embodiment the flocculant is selected from the group Praestol 2350, Praestol 2505, Praestol 2510, Praestol 2515, Praestol 2520, Praestol 2525, Praestol 2530 or Praestol 2531. In one embodiment the flocculant is Praestol 2515.

In one embodiment in sub-step a1.5) the separation of waste is performed by decantation, filtration or through use of a centrifuge or a combination of the same.

In one embodiment the concentration of $Mg^{2+}$ present in the brine decreases to a value lower than 5 mg/l. In one embodiment the concentration of $Mg^{2+}$ is reduced by nanofiltration. In various embodiments the concentration of $Mg^{2+}$ is reduced by increasing the pH to a level of no less than 11.3 by the addition of suitable chemical reagents, such as alkaline metal hydroxides, slacked lime, and/or alkaline metal carbonates, and/or the concentration of $Mg^{2+}$ is reduced by the use of ionic exchange resins, and/or using nanofiltration, and/or electrolysis.

In one embodiment the feed brine is subjected to at least one step a'1) of pre-concentration before step a1).

In one embodiment the step of pre-concentration is performed in solar ponds. In one embodiment the solar ponds are natural ponds without artificial coating or ponds with artificial coating. In one embodiment the artificial coating is an impermeable plastic polymer film. In one embodiment the plastic polymer is made from polyethylene.

In one embodiment the step of pre-concentration is performed until the concentration of $Li^+$ reaches a value ranging from about 2,000 to 3,000 mg/l. In one embodiment the step of pre-concentration continues until the concentration of $Li^+$ reaches a value ranging from about 10,000 to 15,000 mg/l. In one embodiment the process optionally comprises diluting the preconcentrated brine by mixing it with a suitable amount of mother liquor recycled from a later process of precipitation of lithium carbonate, and/or natural brine. In one embodiment where in sub-step a'1) no dilution takes place with mother liquor recycled from the process of precipitation of lithium carbonate and/or natural brine occurs and impurities are removed from the preconcentrated brine converting compounds such as magnesium, calcium, sulphate, boron and bicarbonate into magnesium hydroxide, dehydrated calcium sulphate (gypsum) of the formula $CaSO_4 \cdot 2H_2O$, hydrated calcium borate of the formula $CaB_2O_4 \cdot 6H_2O$ and calcium carbonate, respectively. In another embodiment in sub-step a'1) dilution with mother liquor recycled from a process of precipitation of lithium carbonate and/or natural brine occurs and boron is additionally removed in the step of final concentration as borate of the formula $2CaO \cdot 3B_2O_3 \cdot 13H_2O$. In one embodiment in sub-step a'1) dilution with mother liquor recycled from a process of precipitation of lithium carbonate, and/or natural brine occurs and the preconcentrated and treated brine is concentrated by evaporation to reach a concentration of $Li^+$ ranging from between about 4,200 to 4,800 mg/l. In another embodiment the process of concentration of the preconcentrated and treated brine is continued up to a concentration of $Li^+$ ranging from about 10,000 to 15,000 mg/l.

In one embodiment the process may further comprise (a2) concentrating the brine to increase the concentration of $Li^+$ ions.

In one embodiment in step a2) the concentration of $Li^+$ ion is increased to about 10,000 to 15,000 mg/l.

In one embodiment in step a2) of concentrating by evaporation the brine processed in a1) comprises the sub-steps of:
a2.1) concentrating the brine from step a) by evaporation to increase the concentration of ion $Li^+$ from between about 4,200 to 4,800 mg/l, and additionally separating the precipitated solids;
a2.2) adjusting the pH of the concentrated brine in a2.1) to a value ranging from about 8.2 to 8.4; and
a2.3) concentrating the brine from step a.2.2) to increase the concentration of $Li^+$ ion from between about 4,200 to 4,800 mg/l to between about 10,000 to 15,000 mg/l, and additionally separating the precipitated solids.

In one embodiment calcium chloride in aqueous solution is added so that the concentration of $SO_4^{2-}$ ions is lower than about 3,000 mg/l at the end of step a2.3). In one embodiment the process may further comprise (b) obtaining lithium carbonate from the concentrated brine by precipitating the solid by adding an aqueous solution of a soluble carbonate and separating the solid.

In one embodiment the step b) for obtaining crude lithium carbonate from the brine concentrated in the step a2) comprises the sub-steps of:
b1) precipitating $Ca^{2+}$ by adding a sodium carbonate or other carbonate solution (may be an aqueous solution) at low temperature;
b2) adjusting the pH of the brine to a value ranging from about 10.5 to 10.8;
b3) separating the precipitated $CaCO_3$;

b4) diluting the brine with fresh water and/or with mother liquor recycled from a process of precipitation of lithium carbonate to a concentration of $Li^+$ of about 8,000-9,000 mg/l;

b5) precipitating lithium carbonate by adding sodium carbonate or other carbonate solution (may be an aqueous solution) and heating the mixture at a temperature above about 92° C.;

b6) separating the precipitated $Li_2CO_3$ solid;

b7) washing the lithium carbonate solid by resuspending the same in hot fresh water; and b8) separating the $Li_2CO_3$ washed solid.

In one embodiment the aqueous solution of sodium carbonate from step b5) is at a temperature ranging from about 30° C. to 35° C.

In one embodiment the separation of lithium carbonate solid precipitated from step b6) is by use of a centrifuge. In embodiment hot fresh water from step b7) is at a temperature above about 92° C.

In one embodiment the separation of washed lithium carbonate precipitated from b8) is by use of a centrifuge.

In one embodiment the process may further comprise (c1) redissolving and reprecipitating the lithium carbonate to produce high purity lithium carbonate and separating the solid.

In one embodiment the step c1) of purifying lithium carbonate comprises the sub-steps of:

c1.1) dissolving the crude lithium carbonate to obtain a limpid solution with a concentration of $Li^+$ ranging from about 8,800 to 9,200 mg/l and filtering the insoluble impurities;

c1.2) precipitating purified lithium carbonate by adding an aqueous solution of sodium carbonate and heating the mixture to a temperature above about 92° C.;

c1.3) separating the precipitated $Li_2CO_3$;

c1.4) washing the purified lithium carbonate by resuspending the same in hot fresh water;

c1.5) separating the washed $Li_2CO_3$; and c1.6) drying the purified lithium carbonate.

In one embodiment the dissolution of lithium carbonate from step c1.1) is performed by the addition of a mineral acid. In one embodiment the mineral acid is sulfuric acid or hydrochloric acid. In one embodiment the aqueous solution of sodium carbonate from step c1.2) is at a temperature ranging from about 30° C. to 35° C. In one embodiment the separation of purified lithium carbonate precipitated from step c1.3) is achieved by use of a centrifuge. In one embodiment the hot fresh water from step c1.4) is at a temperature above about 92° C. In one embodiment the separation of washed purified lithium carbonate from step c1.5) is by use of a centrifuge. In one embodiment the drying of the purified lithium carbonate from step c1.6) is performed at a temperature ranging from about 130 to 135° C.

In one embodiment the step c'1) of purifying crude lithium carbonate comprises the sub-steps of:

c'1.1) suspending the crude lithium carbonate in water;

c'1.2) injecting $CO_2$ at a sufficient pressure to attain a continuous bubbling at room temperature;

c'1.3) filtering the insolubles;

c'1.4) precipitating purified lithium carbonate maintaining the resulting solution under agitation at atmospheric pressure and at a temperature above about 90° C.;

c'1.5) separating the precipitated purified $Li_2CO_3$;

c'1.6) washing the purified $Li_2CO_3$ by resuspending the same in hot fresh water;

c'1.7) separating the washed $Li_2CO_3$; and c'1.8) drying the purified lithium carbonate.

In one embodiment the separation of purified lithium carbonate precipitated from step c'1.5) is by use of a centrifuge.

In one embodiment the mother liquor is recycled for the process of dilution in the production reactor for crude lithium carbonate. In one embodiment the hot fresh water from step c'1.6) is at a temperature above about 92° C.

In one embodiment separation of washed purified lithium carbonate solid from step c'1.6) is by use of a centrifuge. In one embodiment the washing water is recycled to the start of the purification process. In one embodiment the drying of purified lithium carbonate from step c'1.8) is performed at a temperature ranging from about 130 to 135° C.

In one embodiment (c2) the process may further comprise preparing a solution of lithium chloride from the lithium carbonate.

In one embodiment the process comprises:

c2.1) mixing purified $Li_2CO_3$ with a sufficient amount of water;

c2.2) adding slowly and under agitation a solution of HCl in sufficient quantity to attain a concentration of $Li^+$ of no less than 50 g/l in the solution.

In one embodiment the purified $Li_2CO_3$ has a purity above 99% w/w. In one embodiment the HCl ranges from about 32 to 35% w/w. In one embodiment the solution of lithium chloride obtained comprises from about 21 to 23% w/w of Cl and from about 4.2 to 4.5% w/w of $Li^+$.

In one embodiment approximately 70% to 75% w/w of the lithium contained in the brine used as raw material is recovered.

In one embodiment lithium is recovered as high purity lithium carbonate or lithium chloride.

There is also disclosed herein a processed brine solution, lithium carbonate or lithium chloride prepared by the process of the invention.

Some naturally occurring brines contain a considerable amount of lithium in the form of lithium chloride. These brines are potential reserves for lithium recovery.

According to the present invention, at least in one embodiment, a high percentage of the lithium content in naturally occurring brines or any other impure brine containing lithium can be recovered as high purity lithium carbonate, from which it is also possible to obtain a solution of lithium chloride for producing electrolytic grade lithium chloride. Typically, naturally occurring brine only contains some hundreds of parts per million of lithium together with significant amounts of sodium, potassium, magnesium, calcium, chloride, sulphate and boron, as well as other minor contaminants such as bicarbonate.

There is disclosed herein a process for recovering lithium as high purity lithium carbonate and later obtaining a solution of lithium chloride for producing electrolytic grade lithium chloride comprising three steps consisting of:

STEP I (a1, a2): Treatment and concentration of the brine to be processed. (In the flow chart I of FIG. 5, a1 corresponds to Alt. I-1 and a2 corresponds to Alt. I-2).

STEP II (b): Obtaining crude lithium carbonate from the treated and concentrated brine obtained in STEP I.

STEP III (c1, c2): Obtaining high purity lithium carbonate, designated purified, and optionally a solution of lithium chloride for producing electrolytic grade lithium chloride.

In a preferred embodiment of this invention, the process for recovering lithium as high purity lithium carbonate from impure natural or industrial brine comprises:

a1) adjusting the pH of a feed brine to a value of no less than 11.3 and separating the waste solids, forming a slurry containing lithium values;

a2) concentrating by evaporation the brine processed in a1) to increase the concentration of $Li^+$ ions;

b) obtaining crude lithium carbonate from the brine concentrated in a2) by precipitating the same by adding an aqueous solution of a soluble carbonate and separating the resulting crude lithium carbonate solid;

c1) purifying the crude lithium carbonate obtained in b) by redissolving and reprecipitating the same, separating the purified lithium carbonate solid; and c2) optionally additionally, preparing a solution of lithium chloride from the purified lithium carbonate obtained in c1) for producing electrolytic grade lithium chloride.

In another preferred form of the process for recovering lithium as high purity lithium carbonate from an impure natural or industrial brine, the step a1) comprises the sub-steps:

a1.1) adding lime to the solution of feed brine taking the pH to a value of no less than 11.3 precipitating a waste solid and forming a reaction slurry;

a1.2) adjusting the concentration of $Ca^{2+}$ in the liquid phase of the reaction slurry;

a1.3) additionally, if required, adjusting the pH in the liquid phase of the reaction slurry to a value of no less than 11.3 by adding an effective amount of an aqueous basic solution;

a1.4) optionally, adding a flocculant solution to the reaction slurry to aid in the separation of waste solids from the processed brine solution; and a1.5) separating the waste solids precipitated from the reaction slurry to form a processed brine solution and a sludge.

In a further preferred embodiment of the process for recovering lithium as high purity lithium carbonate from an impure natural or industrial brine, the step a1) comprises the sub-steps:

a1.1) adding a lime slurry to an impure brine taking the pH to a value of no less than 11.3 to reduce the concentration of magnesium to less than 5 mg/l by precipitating the magnesium out as $Mg(OH)_2$;

sulphate ($SO_4^{2-}$) by precipitating the sulphate out as $CaSO_4.2H_2O$;

boron by precipitating the boron out as $CaB_2O_4.6H_2O$ and $2CaO.3B_2O_3.13H_2O$;

bicarbonate ($HCO_3^-$) and carbonate ($CO_3^{2-}$) by precipitating both out as $CaCO_3$;

a1.2) adjusting the concentration of $Ca^{2+}$ ions in order to induce the precipitation of remaining boron, sulphate and carbonate;

a1.3) additionally, if required, adjusting the pH of the mixture to a value of no less than 11.3;

a1.4) optionally, adding an aqueous solution of an anionic flocculant to the reaction slurry to aid in the separation of the waste solids from the brine; and a1.5) separating the precipitated waste solids from the reaction slurry forming a processed brine solution and a sludge.

In another preferred embodiment of the process for recovering lithium as high purity lithium carbonate from an impure natural or industrial brine, step a2) of concentrating by evaporation the brine processed in a1) comprises the sub-steps:

a2.1) concentrating the brine from step a) by evaporation to increase the concentration of $Li^+$ ion to between about 4,200 to 4,800 mg/l, and additionally separating the precipitated solids;

a2.2) adjusting the pH of the concentrated brine in a2.1) to a value ranging from about 8.2 to 8.4; and a2.3) concentrating the brine from step a.2.2) to increase the concentration of $Li^+$ ions from between about 4,200 to 4,800 mg/l to between about 10,000 to 15,000 mg/l, and additionally separating the precipitated solids.

Alternatively, in another preferred embodiment of the process for recovering lithium as high purity lithium carbonate from an impure natural or industrial brine, the solution of feed brine is subjected to at least one step a'1) of pre-concentration prior to step a1).

Preferably, the step of pre-concentration is performed in solar ponds, wherein solar ponds are natural ponds without artificial coating or ponds with artificial coating. An artificial coating may be a high density polyethylene membrane.

Preferably, the step of pre-concentration is performed until the concentration of $Li^+$ has a value ranging from about 2,000 to 3,000 mg/l, and more preferably the pre-concentration step continues until the concentration of $Li^+$ reaches a value ranging from about 10,000 to 15,000 mg/l.

In another aspect of the present invention, the process for recovering lithium as high purity lithium carbonate from an impure natural or industrial brine, wherein step b) of obtaining crude lithium carbonate from the brine concentrated in the step a2), suitably comprises the sub-steps:

b1) precipitating $Ca^{2+}$ by adding an aqueous solution of sodium carbonate at low temperature;

b2) adjusting the pH of the brine to a value ranging from about 10.5 to 10.8;

b3) separating the precipitated $CaCO_3$;

b4) diluting the brine with fresh water to a concentration of $Li^+$ ranging from 8,000 to 9,000 mg/l;

b5) precipitating crude lithium carbonate by adding an aqueous solution of sodium carbonate and heating the mixture to a temperature above about 92° C.

b6) separating the precipitated crude $Li_2CO_3$ solid;

b7) washing the crude lithium carbonate solid by resuspending the same in hot fresh water; and b8) separating the $Li_2CO_3$ washed solid.

In another aspect of the present invention, the process for recovering lithium as high purity lithium carbonate from an impure natural or industrial brine, wherein the step c1) of purifying the crude lithium carbonate suitably comprises the sub-steps:

c1.1) dissolving the crude lithium carbonate solid to obtain a solution with a concentration of $Li^+$ ranging from about 8,800 to 9,200 mg/l, and filtering the insoluble impurities;

c1.2) precipitating purified lithium carbonate by adding an aqueous solution of sodium carbonate and heating the resulting mixture;

c1.3) separating the precipitated $Li_2CO_3$ solid;

c1.4) washing the purified lithium carbonate solid by resuspending the same in hot fresh water;

c1.5) separating the washed $Li_2CO_3$ solid; and c1.6) drying the purified lithium carbonate.

In another aspect of the present invention, the process for recovering lithium as high purity lithium carbonate from an impure natural or industrial brine, wherein the step c'1) of purifying crude lithium carbonate, suitably comprises the sub-steps:

c'1.1) suspending the crude lithium carbonate solid in water;

c'1.2) injecting $CO_2$ at atmospheric pressure adequate to attain a continuous bubbling and at room temperature;

c'1.3) filtering the insolubles;

c'1.4) precipitating purified lithium carbonate whilst agitating the resulting solution at atmospheric pressure and at a temperature above about 90° C.;

c'1.5) separating the purified precipitated $Li_2CO_3$ solid;

c'1.6) washing the purified $Li_2CO_3$ solid by resuspending the same in hot fresh water;

c'1.7) separating the washed $Li_2CO_3$ solid; and c'1.8) drying the purified lithium carbonate.

In another aspect of the present invention, the process for recovering lithium as high purity lithium carbonate from an impure natural or industrial brine, wherein the step c2) of preparing a solution of lithium chloride from the purified lithium carbonate obtained in c1) for producing electrolytic grade lithium chloride, suitably comprises the sub-steps:

c2.1) mixing purified $Li_2CO_3$ with a sufficient amount of water; and c2.2) adding slowly and under agitation a solution of HCl in sufficient quantities to attain a concentration of $Li^+$ of no less than 50 g/l in the solution.

Utilizing the above described complete process to obtain high purity lithium carbonate from an impure natural or industrial brine or a solution of lithium chloride from the same, it is possible to recover from about 70% to 75% w/w of the lithium content in the brine used as raw material.

DETAILED DESCRIPTION OF PREFERRED EMBODIMENTS OF THE INVENTION

Definitions

Figure 1:
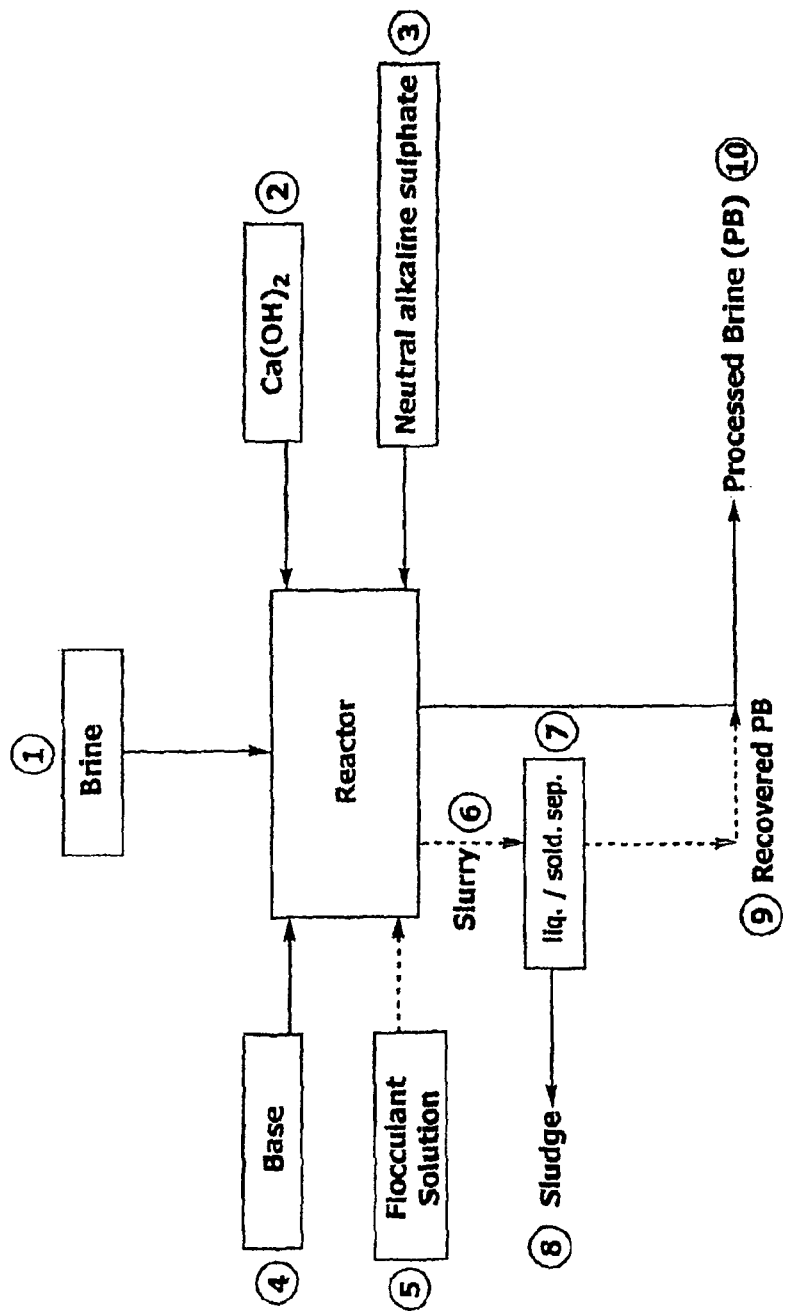
FIG. 1 is a flow diagram of one embodiment of the present invention to produce processed brine (PB).

The following are some definitions that may be helpful in understanding the description of the present invention. These are intended as general definitions and should in no way limit the scope of the present invention to those terms alone, but are put forth for a better understanding of the following description.

Unless the context requires otherwise or specifically stated to the contrary, integers, steps, or elements of the invention recited herein as singular integers, steps or elements clearly encompass both singular and plural forms of the recited integers, steps or elements.

Throughout this specification, unless the context requires otherwise, the word "comprise", or variations such as "comprises" or "comprising", will be understood to imply the inclusion of a stated step or element or integer or group of steps or elements or integers, but not the exclusion of any other step or element or integer or group of elements or integers. Thus, in the context of this specification, the term "comprising" means "including principally, but not necessarily solely".

The information provided herein and references cited are provided solely to assist the understanding of the reader, and do not constitute an admission that any of the references or information is prior art to the present invention.

The term "brine" as used in this description means water ($H_2O$) highly impregnated with salts. Currently, waters containing a high concentration of dissolved solids constitute an important source of mineral salts. Brines are an important source of common salt (sodium chloride), potassium, bromine, boron, lithium, iodine, magnesium and sodium carbonate.

The term "salar" or "brine deposit" as used in this description is understood as an evaporite that is essentially a concave basin area that has accumulated and/or accumulates salts of hydrothermal and/or volcanic origin, and that in past geological eras was a salt lake with a high content of salts.

As used in this description, the term "substantially" means that the form, circumstance, magnitude, measurement or any other described characteristic but syntactically associated with it, resemble as desired to the form, circumstance, magnitude, measurement or any other characteristic as unequivocally or definitively known.

Specifically, this term means that the described matter is practically equivalent for the purposes of the invention or is similar to the particular reference used for the description, but not necessarily being identical in form).

Moreover, the terms "about", "of about", "approximately" or similar, used in this description and claims mean that the numerical values affected are close to the value specifically mentioned and are within a range of plus or minus 20% of the numerical value, preferably within a range of plus or minus 10% of the value and, even more preferably within a range of plus or minus 5% of the value. Ranges are determined by the measuring method used and the confidence limits established in the corresponding determinations.

This invention is based on the discovery that by a suitable chemical treatment, pH control, and in one embodiment a process of concentration by evaporation, the content of undesirable impurities, such as magnesium, calcium, potassium, sodium, sulphate, boron and bicarbonate may be reduced drastically in naturally occurring brines containing lithium.

According to this invention, it has been discovered that it is possible to reduce the impurity content of impurities of brines containing lithium whilst at the same time considerably minimizing the loss of lithium, through in one embodiment the systematic treatment of the brine with lime, regulating the content of calcium in the brine with a solution of a neutral alkaline sulphate and, if necessary, adding a basic aqueous solution to adjust the pH of the brine solution to a value of no less than 11.3, forming a reaction slurry that can be processed to separate the waste solids of the treated brine.

Surprisingly and unexpectedly it has been discovered that by maintaining the pH value at a value of no less than 11.3, the magnesium hydroxide remains insoluble and facilitates the efficient separation of the liquid from the precipitated impurities which are in the form of waste solids. That is, the optimum pH for a maximum efficient filtration is no less than 11.3. At a pH value lower than this, the reaction slurry has very poor separation characteristics, in particular, the filtration characteristics are very poor.

During the final step of the treatment of the brine solution, a flocculant can also be added to aid the separation of waste solid materials and the treated brine containing lithium. Thus, this invention provides a method wherein the formation of salts which contain insoluble impurities is encouraged while the concentration of $Li^+$ ions in the brine solution is substantially maintained.

In one embodiment of the present invention, lime (calcium oxide, CaO) is added directly to the solution during the first step of the invention. In another embodiment, lime is first hydrated to form calcium hydroxide, $Ca(OH)_2$. Calcium hydroxide is also often referred to as lime water, milk of lime, and hydrated or slaked or slacked lime.

Neutral alkaline sulphates used in the practice of the present invention to control the content of calcium in the brine include, for example, $Na_2SO_4$, $K_2SO_4$ and $Li_2SO_4$. In particular embodiments, the preferred neutral alkaline sulphate is $Na_2SO_4$.

A representative composition of a brine suitable for the implementation of the present invention is shown in Table 2 below.

TABLE 2

Composition of naturally occurring brine of Salar del Rincón, Argentina.

| Component | Composition (mg/L) |
|---|---|
| $Li^+$ | 394 |
| $Mg^{2+}$ | 3,667 |
| $Ca^{2+}$ | 712 |
| $K^+$ | 7,972 |
| $Na^+$ | 114,903 |
| $SO_4^{2-}$ | 12,334 |
| $Cl^-$ | 195,067 |
| $B_4O_7^{2-}$ | 1,762 |
| $HCO_3^-$ | 368 |

It is highly desirable to reduce the concentration of ionic impurities, such as $Mg^{2+}$, $Ca^{2+}$, $K^+$, $Na^+$, $SO_4^{2-}$, $Cl^-$, $B_4O_7^{2-}$, $HCO_3^-$, while keeping the concentration of lithium ions in solution.

In a preferred embodiment of the invention as shown in FIG. 1, the first step in the process is reducing the concentrations of $Mg^{2+}$ in the brine (1), that has a composition as listed in Table 2, by adding a lime slurry $Ca(OH)_2$ (2), and agitating. The amount of $Ca(OH)_2$ should be sufficient to react with the magnesium present and form insoluble magnesium hydroxide. Without wishing to be bound by any theory, the following reactions are thought to occur during this step:

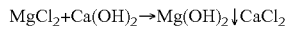

$MgCl_2 + Ca(OH)_2 \rightarrow Mg(OH)_2\downarrow + CaCl_2$

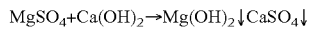

$MgSO_4 + Ca(OH)_2 \rightarrow Mg(OH)_2\downarrow + CaSO_4\downarrow$

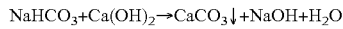

$NaHCO_3 + Ca(OH)_2 \rightarrow CaCO_3\downarrow + NaOH + H_2O$

Agitation favors the solid-liquid reaction equilibrium and keeps the insoluble substances in suspension.

Figure 2:
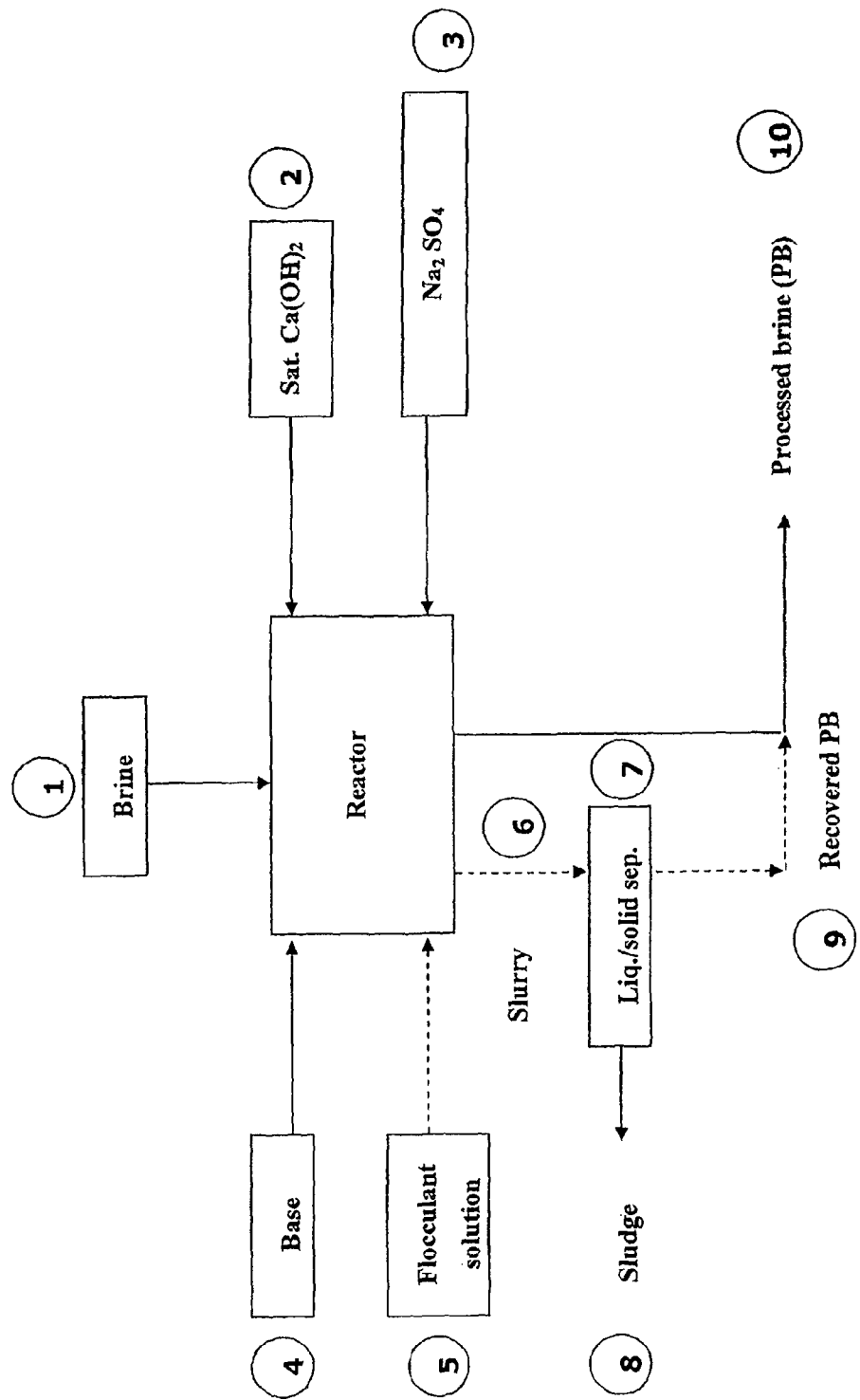
FIG. 2 is a flow diagram of another embodiment of the present invention to produce processed brine (PB).

This step is followed by dosing with a solution of neutral alkaline sulphate, such as for example a $Na_2SO_4$ solution (3), as shown in FIG. 2. It is believed that the following reaction occurs to regulate the concentration of $Ca^{++}$:

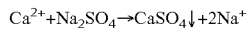

$Ca^{2+} + Na_2SO_4 \rightarrow CaSO_4\downarrow + 2Na^+$

Further agitation of this solution encourages the contact of the reagents and keeps the insoluble substances in suspension.

Finally and if necessary, once the treatment with $Na_2SO_4$ is completed, the slurry is treated with an aqueous basic solution (4) in order to adjust the pH to a value of no less than 11.3.

It is desirable that the treatment with $Na_2SO_4$ regulates the concentration of $Ca^{2+}$ in the solution through the formation of $CaSO_4$. The concentration of $Ca^{2+}$ should be regulated in order to induce the precipitation of boron, sulphate and carbonate during the concentration step by evaporation of the treated brine.

At the same time, this treatment surprisingly keeps the $Mg(OH)_2$ insoluble and allows the products to be separated efficiently so as to remove the solids precipitated as waste sludge (6) and to allow the processed brine solution (PB) (10) to be separated from the sludge (6). Additionally, a flocculant solution (5) can be added to the reactor to help in the liquid/solid separation.

The sludge (6) can be processed in a liquid separator (7) for example using a centrifuge or filtration or a combination of a centrifuge and filtration for producing solid waste (8) and for recovering limpid processed brine (9) which can be added to the processed brine (10).

Figure 3:
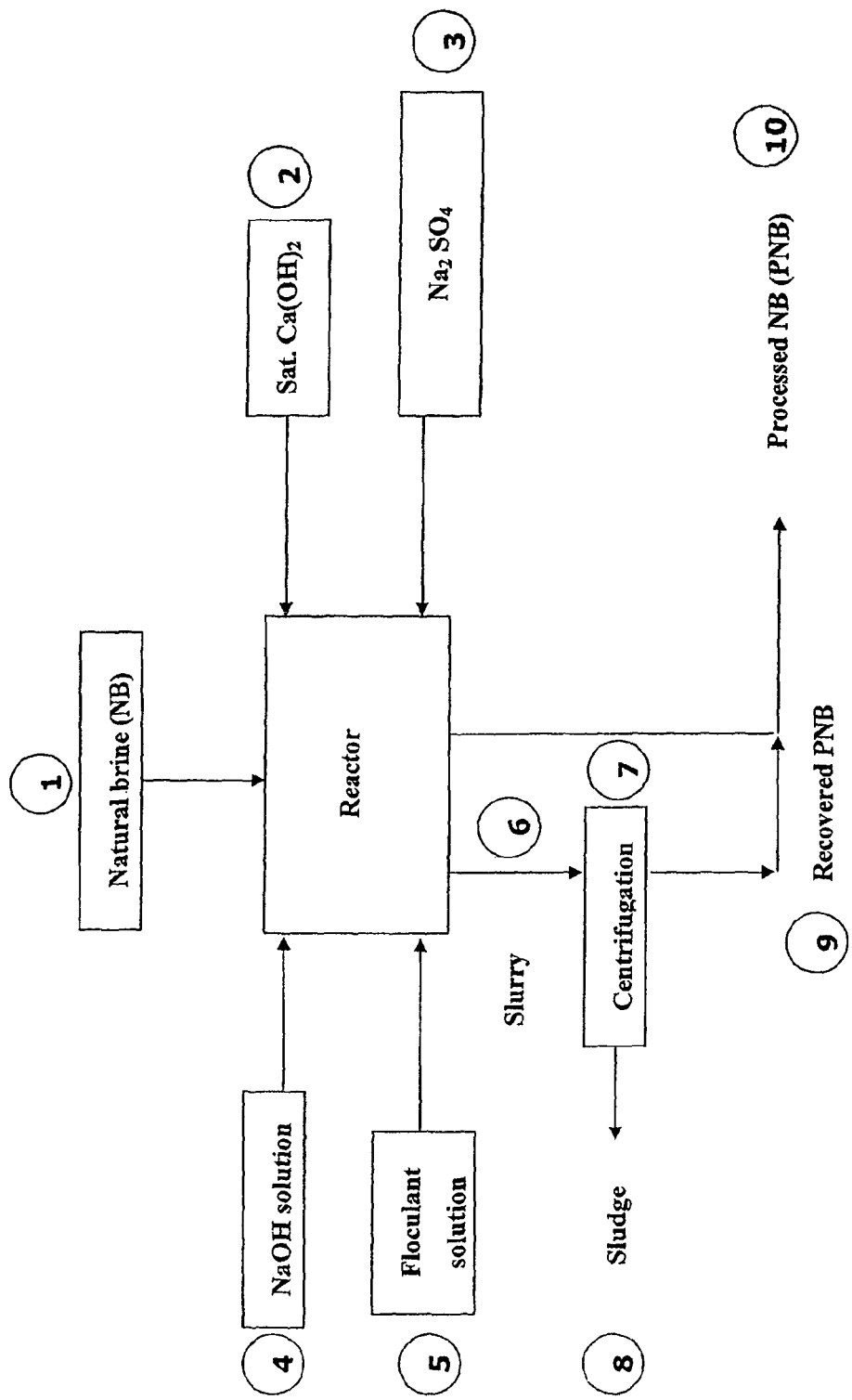
FIG. 3 is a flow diagram of yet another embodiment of the present invention to produce processed natural brine (PNB).
Figure 4:
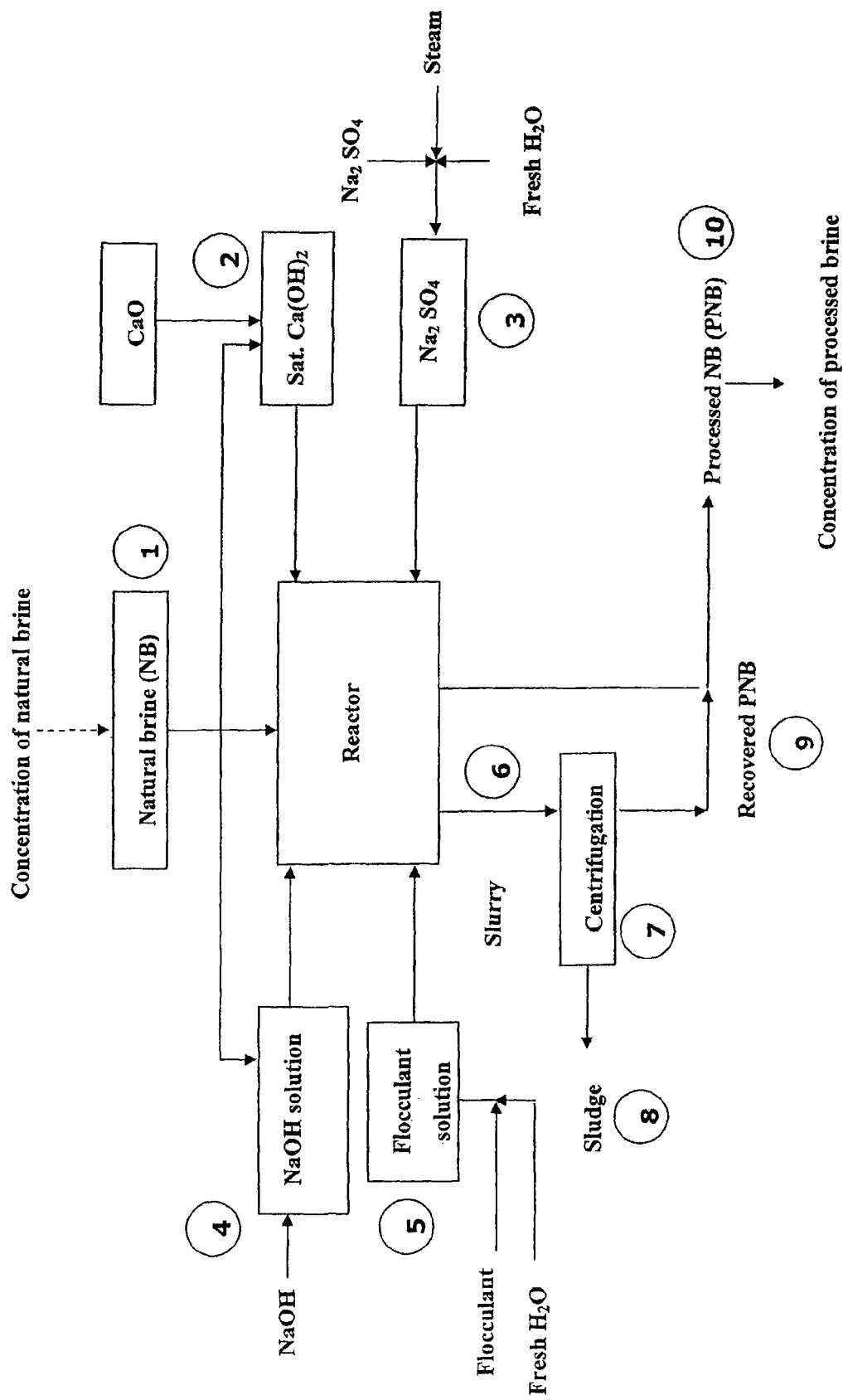
FIG. 4 is a flow diagram of yet another embodiment of the present invention to produce processed natural brine (PNB).

FIG. 3 shows an alternative form of the procedure described so far, where the brine (1) is natural and separation is performed by use of centrifuge. For its part, FIG. 4 shows another alternative of the procedure which provides details of the solvent used to prepare the lime slurry (2) and the NaOH solution (4) from the natural brine (1), while the solvent used for preparing the solution of $Na_2SO_4$ (3) and flocculant solution (5) is pure water, and the processed natural brine (10) is sent to a concentration step.

Representative compositions of the waste sludge and the solution of processed natural brine (PNB) resulting from the application of the present invention are shown in Table 3.

TABLE 3

Typical composition of resulting processed natural brine (PNB) and sludge

| | Composition | |
|---|---|---|
| Component | Waste Sludge (%) | Processed Brine (PB) (mg/L) |
| $Li^+$ | 0.09 | 374 |
| $Mg^{2+}$ | 3.41 | — |
| $Ca^{2+}$ | 4.52 | 1,307 |
| $K^+$ | 1.8 | 8,067 |
| $Na^+$ | 25.92 | 111,916 |
| $SO_4^{2-}$ | 8.31 | 7,633 |
| $Cl^-$ | 37.98 | 179,600 |
| $B_4O_7^{2-}$ | 0.367 | 1,150 |

In one embodiment, a subsequent increase in the concentration of the processed natural brine, such as for example by solar evaporation, causes the NaCl and KCl to precipitate out together with calcium borates, calcium sulphate, calcium carbonate, resulting in the brine being additionally purified and therefore producing processed concentrated natural brine (CPNB).

Thereafter, $Ca^{2+}$ may be precipitated with a solution of a cold alkaline carbonate at room temperature, after which $Li^+$ may be precipitated with a solution of a alkaline carbonate at higher temperature.

After this, it is possible in one embodiment to purify the obtained lithium carbonate, by dissolving and re-precipitating the same at a temperature above about 92° C. with an alkaline carbonate.

Henceforth the application of the integrated process of the present invention is described in detail for the specific case of obtaining high purity lithium carbonate from naturally occurring brine from the Salar del Rincón (Province of Salta—Argentina), using solar energy in the different sub-steps of concentration of the brine.

Detailed Description of the Process

Consequently, to obtain high purity lithium carbonate from impure brines containing lithium, it is necessary to minimize the content in the brine of magnesium, calcium, sulphate, boron, sodium, potassium and bicarbonate prior to crystallization and subsequent recrystallization of lithium carbonate.

The integral process according to the present invention consists of various steps and sub-steps for obtaining concentrated and conditioned brine for the process of precipitation of lithium carbonate, which can be performed from any impure brine in which the amount of lithium chloride and the amount of impurities are within an economically acceptable ratio.

For a better understanding of the process, the preferred embodiments, which are only illustrative and non-limiting, will be detailed.

The present invention is described now with reference to a naturally occurring brine (hereinafter NB), specifically a naturally occurring brine from the Salar del Rincón, Argentina, although it is understood that the process corresponds to lithium brines of any origin, including industrial non-natural sources.

There is disclosed herein at least in one embodiment a process for recovering lithium as high purity lithium carbonate from impure natural or industrial brine that comprises:

a1) adjusting the pH of a feed brine to a value of no less than 11.3 and separating the waste solids, forming a reaction slurry;

a2) concentrating by evaporation the brine processed in a1) in order to increase the concentration of $Li^+$ ions;

b) obtaining crude lithium carbonate from the brine concentrated in a2), precipitating the same by adding an aqueous solution of a soluble carbonate and separating the crude lithium carbonate solid;

c1) purifying the crude lithium carbonate obtained in b) by redissolving and reprecipitating the same, separating the purified lithium carbonate solid; and c2) a possible additional step, if desired, of preparing a solution of lithium chloride from the purified lithium carbonate obtained in c1) for producing electrolytic grade lithium chloride.

Description of the Steps of the Process

In one embodiment the process for recovering lithium from natural or industrial impure brines as high purity lithium carbonate for subsequently obtaining a solution of lithium chloride to produce electrolytic grade lithium chloride, comprises three principal steps consisting of:

STEP I (see FIG. 5): Treatment and concentration of the brine to be processed.

STEP II (see FIG. 6): Obtaining the so-called crude lithium carbonate, from the treated and concentrated brine obtained in STEP I.

STEP III (see FIG. 7): Obtaining high purity or purified lithium carbonate, and optionally a solution of lithium chloride for producing electrolytic grade lithium chloride.

STEP I: Treatment and Concentration of the Brine to be Processed

Depending on the chemical composition of the brine to be processed, this first step may be executed with or without a pre-concentration sub-step. The choice of which alternative is the best is made taking into consideration technical and economic optimization of the process depending on the composition of the brine.

Alternative Path I-1: Without Pre-Concentration of the Brine

This alternative is performed when a pre-concentration of the brine does not sufficiently reduce the amount of insolubles obtained during the pre-concentration process, or where there is a risk of precipitation of lithium salts during a possible pre-concentration step of the brine. In this case, STEP I is performed directly on the impure brine in the following sub-steps:

Sub-step a1: This consists in one embodiment of removing the impurities by converting components such as magnesium, calcium, sulphate, boron and bicarbonate into magnesium hydroxide, dehydrated calcium sulphate (gypsum) of the formula $CaSO_4.2H_2O$, hydrated calcium borate of the formula $CaB_2O_4.6H_2O$ and/or borate of the formula $2CaO.3B_2O_3.13H_2O$, and calcium carbonate, respectively.

Prior to concentrating the brine through evaporation, the brine is treated to reduce the content of impurities such as magnesium, calcium, sulphate, boron and bicarbonate by turning them into magnesium hydroxide, dehydrated calcium sulphate (gypsum) of the formula $CaSO_4.2H_2O$, and hydrated calcium borate of the formula $CaB_2O_4.6H_2O$ and/or borate of the formula $2CaO.3B_2O_3.13H_2O$, and calcium carbonate, respectively. This sub-step can be performed in one or in a succession of multiple operations, depending on the amount of insoluble substances obtained during the treatment of the brine.

Sub-step a1.1: This first sub-step aims to reduce the concentration of magnesium to levels below 5 mg/l, which is achieved by applying any of the following alternatives, or combinations thereof, that ensure that the above-mentioned objective is attained:

i) Treatment with Lime.

For this purpose, $Ca(OH)_2$ exceeding between about 4-7% the value corresponding to the stoichiometric requirement is added. This is defined by the following reaction:

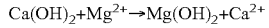

$$Ca(OH)_2 + Mg^{2+} \rightarrow Mg(OH)_2 + Ca^{2+}$$

Slacked lime is added in the form of lime slurry prepared by mixing it with a portion of the brine to be treated; the approximate ratio of this mixture ranges from about 73 to 76 kg of slacked lime per $m^3$ of brine. This operation is carried out with intense agitation for about ten minutes or more after adding all the lime. Subsequently, the pH of the mixture is determined.

If this pH value is equal to or higher than about 11.3 measured at a temperature of 23° C., the following sub-step a1.2 is performed.

Otherwise, agitation is resumed and an additional amount of slacked lime equivalent to about 2.8-3.2% of the stoichiometric value initially calculated may be added. In this case, slacked lime is added using a previously prepared suspension utilizing a portion of the mixture obtained when preparing the first lime slurry mixture, in an approximate ratio of about 28-32 kg of slacked lime per $m^3$ of mixture. As previously, ten minutes after adding the additional lime, the pH of the mixture is checked in order to see if the pH is equal to or higher to 11.3 measured at a temperature of 23° C.

If necessary, the operation described for additionally adding slacked lime is repeated, until the referred pH value for the resulting mixture is obtained. Under these conditions it is ensured that the content of magnesium is lower than 5 mg per liter of impure treated brine.

As an alternative to point i) or, preferably, in combination with the point i), the following alternatives can be used:

ii) Treatment with a Soluble Hydroxide.

In this case it is possible to use sodium hydroxide or any hydroxide soluble in water so as to obtain a brine pH value equal to or higher than 11.3 measured at 23° C.

iii) Treatment with a Soluble Carbonate.

This variation comprises adding sodium carbonate or any other soluble carbonate in water so as to obtain a brine pH value equal to or higher than 11.3 measured at 23° C.

iv) Electrolysis of Impure Brine.

Electrolysis of impure brine may be performed utilizing direct current (DC) until the pH value is equal to or higher than 11.3 measured at 23° C.

v) Treatment with Ionic Exchange Resins.

It is also possible to reduce the concentration of magnesium in the brine to levels less than 5 mg/l, by passing the brine through a bed containing a basic ionic interchange resin that releases hydroxyl ions into the brine and retains the cations that have been dissolved in the brine.

vi) Reduction of the Concentration of Magnesium Using Nanofiltration

The brine is suitably passed through a nanofiltration filter so that the $Mg^{2+}$ present in the brine is retained, thereby decreasing its concentration to a value lower than 5 mg/l.

The nanofiltration separation uses a membrane with pore sizes and operating pressures whose values are between those of ultrafiltration membranes and those of inverse osmosis membranes. Typical operating pressures vary between about 1 MPa to about 6 MPa.

The nanofiltration membranes prevent the passing of only a portion of the total of dissolved solids, being mainly divalent ions, and remove most of the matter with a particle size greater than 0.1 μm.

Once the treatment is completed to ensure the reduction of the magnesium content, it is preferable that where methods i), ii), iii) and/or iv) are used, (that is except the methods where treatment with ionic exchange resins and/or nanofiltration is used), a flocculant is added in the form of an aqueous solution, and the solid phase is separated by applying any solid-liquid separation process such as decantation, filtration or the usage of a centrifuge.

Sub-step a1.2: As a result of the execution of sub-step a1.1, the concentration of $Ca^{2+}$ ions may be at a higher or lower level than the required level to reduce the content of impurities such as sulphate, calcium, boron and bicarbonate turning them into dehydrated calcium sulphate (gypsum) of the formula $CaSO_4.2H_2O$, hydrated calcium borate of the formula $CaB_2O_4.6H_2O$, borate with the formula $2CaO.3B_2O_3.13H_2O$ and calcium carbonate, respectively.

The appropriate level of concentration of $Ca^{2+}$ ions prior to the process of evaporation is suitably determined by calculating the necessary stoichiometric value required to precipitate all the impurities referred to; for this calculation it is considered that, in the first two sub-steps of the process of evaporation, the boron precipitates as calcium borate hydrate with the formula $CaB_2O_4.6H_2O$.

If the level calculated is lower than the value of the concentration of $Ca^{2+}$ ions in the brine obtained after the execution of sub-step a1.1, the level of $Ca^{2+}$ ions is suitably adjusted by adding a solution of sodium sulphate in water.

If the level calculated is higher than the value of the concentration of $Ca^{2+}$ ions in the brine obtained after the execution of sub-step a1.1, the level of $Ca^{2+}$ ions is suitably adjusted by adding a solution of calcium chloride in water.

Sub-step a1.3: Additionally, if required, the pH of the mixture is adjusted to a value of no less than 11.3 with a hydroxide soluble in water. Sodium hydroxide, potassium hydroxide or any hydroxide soluble in water allowing a brine pH value equal to or higher than 11.3 measured at 23° C. to be obtained, can be used.

The examples of aqueous basic solutions include, for example, solutions of alkaline metal hydroxides. These alkaline metal hydroxides include sodium hydroxide, that is NaOH, potassium hydroxide, that is KOH. It is preferable that the aqueous basic solution utilized in this invention comprises sodium hydroxide.

Sodium hydroxide with formula NaOH comprises ~40.00 grams/mol. It is an alkaline metal hydroxide that is soluble in water and is often referred to as a strong Brönsted base in aqueous solution. Another example of an alkaline hydroxide is potassium hydroxide, with formula KOH that comprises ~56.11 grams/mol. At 25° C., the pH of an aqueous solution of NaOH can be estimated as pH $\sim 14 + \log_{10}$ [NaOH].[OH$^-$], wherein [NaOH].[OH$^-$] denotes the concentration of NaOH in units per moles per liter. An aqueous solution of NaOH with a concentration of 1.0 molar, that is 1.0 mol/liter, thus has a pH of about 14; similarly, the concentrations 0.1, 0.01, 0.001, and 0.0001 molar NaOH produce pH values of 13, 12, 11 and 10, respectively. A solution of 1.0 molar of NaOH is prepared by dissolving 1.0 mol of NaOH, that is 40 grams of NaOH, in an amount of water sufficient to obtain 1.0 liter of solution. In contrast, a solution of NaOH with a concentration of 1.0 molal is prepared by dissolving 1.0 mol of NaOH, that is 40 grams of NaOH, in 1 kilogram of water.

Frequently concentrations are described in units of percentage weight by weight, that is % w/w. For example, an aqueous solution 10% w/w of NaOH is prepared by dissolving 100 grams of NaOH, about 2.5 moles, in water to obtain 1,000 grams of solution.

Alkaline metal hydroxides, such as sodium hydroxide and potassium hydroxide, may be obtained from a wide variety of commercial suppliers in different forms, that is either as a solid or as an aqueous solution, and with different degrees of purity. For the purposes of this invention, moderate, high or very high purity alkaline metal hydroxides can be used provided that the contaminants do not interfere significantly with the treatment of the brine. Preferably, the purity should be higher than 90% w/w, more preferably the purity should be higher than 95 w/w, even more preferably the purity should be higher than 97% w/w, and most preferably the purity should be higher than 99% w/w.

Sub-step a1.4: Optionally, a flocculant in the form of an aqueous solution may be added to aid the efficient separation of the solid phase from the liquid phase; then the solid phase can be separated by applying any liquid-solid separating process such as clarification, decantation, filtration, utilization of a centrifuge, or combinations thereof in order to achieve the liquid-solid separation.

Preferably, the flocculant used in the application of this invention may be a polymeric flocculant. More preferably, the polymeric flocculant can be an anionic polymeric flocculant.

The anionic content of the polymers may range from 0 to 100 moles % of the copolymer, with good results having been observed within the range from 0.1 to 30 moles % of anionic load. Solid form medium to high molecular weight flocculants may be used, either as an aqueous solution, or as water in oil emulsion, or through dispersion in water.

The anionic polymers used in this application may be water soluble acrylamide or methacrylamide vinyl copolymers with the following monomers: acrylic acid, 2-acrylamide-2-methylpropane sulphonate (AMPS) or salts thereof, and mixtures thereof.

The high molecular weight anionic flocculants can also be acrylamide hydrolyzed polymers or copolymers of acrylamide or comparable substances, such as methacrylic acid, or monomers such as maleic acid, itaconic acid, sulphonic vinyl acid, AMPS, or other sulphonate containing monomer.

Anionic polymers may be sulphonates or phosphonates containing polymers that have been synthesized by modifying acrylamide polymers to obtain sulphonates or phosphonates substituents, or mixtures thereof. Specific examples of high molecular weight anionic flocculants are acrylic acid/acrylamide copolymer and sulphonates containing polymers such as 2-acrylamide-2-methylpropane sulphonate/acrylamide copolymer (AMPS), acrylamyl methane acrylamine sulphonate (AMS), acrylamyl ethane acrylamine sulphonate/acrylamide (AES) and 2-hydroxy-3-acrylamide propane sulphonate/acrylamide (HAPS).

Non-limiting examples of suitable anionic flocculant agents include, for example, copolymers of acrylamide and sodium acrylate, such as Praestol 2350, Praestol 2505, Praestol 2510, Praestol 2515, Praestol 2520, Praestol 2525, Praestol 2530, and Praestol 2531. In specific embodiments, Praestol 2515, which is a weakly anionic copolymer of acrylamide and sodium acrylate, or any other flocculant suitable for the process described may be used.

The dosage of the anionic polymer suitably ranges from about 0.003% to 0.5% by weight based on total solids, preferably from about 0.007% to 0.2% and more preferably from about 0.02% to 0.1%.

Sub-step a1.5: This step comprises separating the solid phase by any suitable solid-liquid separation process, for example, decantation, use of a centrifuge, filtration.

According to how sub-steps a1 to a1.4 are performed, this sub-step can also be performed in one or multiple operations, depending on the amount of insoluble substances obtained during the treatment of the brine. The chemical composition of the solids or sludge obtained depends on the content of impurities of the brine used as starting raw material and, eventually, this sludge can be provided for example to a plant for obtaining magnesium compounds, as is the case of the brine of Salar del Rincón.

Sub-step a2: Concentration of the Treated Brine.

In this second sub-step, the treated brine in the previous step is suitably concentrated by evaporation, which may be effected in two sub-steps, as follows:

Sub-step a2.1: In this first sub-step of the process the concentration of $Li^+$ ions is suitably increased in the treated brine to reach a value of between about 4,200 to 4,800 mg/l. This is achieved by applying any process of evaporation that uses any kind of energy.

Depending on the amount and variety of impurities contained in the brine, during the process of evaporation different salts may precipitate as the concentration of $Li^+$ ions increases.

In this case, it may be of interest to subdivide this sub-step to extract the referred salts separately, as long as these byproducts have a commercial value or are of interest.

Sub step a2.2: In this sub-step the pH of the preconcentrated brine obtained in sub-step a1.1 is suitably adjusted to a value ranging from about 8.2 to 8.4.

Sub step a2.3: The process of evaporation is suitably continued until the concentration of $Li^+$ ions reaches a value of about 10,000 to 15,000 mg/l.

As in sub-step 2-1, in this case it can also be of interest to subdivide the execution of this sub-step with the aim of extracting the salts that precipitate separately, as long as these byproducts have a commercial value or are of interest.

Once the process of evaporation is finished, a room temperature concentrated solution is suitably obtained.

During the process of evaporation of sub-steps a2.1 and a2.3 (the) concentrations of calcium, sulphate and boron are suitably monitored and, if necessary, calcium chloride in aqueous solution is suitably added to ensure that at the end of sub-step a2.2 the concentration of $Ca^{2+}$ ions reaches a value such that the concentration of $SO_4^{2-}$ ions is lower than about 3,000 mg/l.

This value for the concentration of $Ca^{2+}$ ions can be theoretically estimated through the value of the solubility product for calcium sulphate at the temperature of the concentrated brine, that is at room temperature, using the model of Pitzer to estimate the activity coefficients of involved ions. Under these conditions, the concentration of boron is adjusted to values lower than about 2,000 mg/l.

Alternative Pathway Alt I-2: With Pre-Concentration of Brine Before Prior Treatment This alternative is performed when the pre-concentration substantially reduces the amount of insolubles obtained during the treatment of the preconcentrated brine and there is no risk of precipitation of lithium salts during the process of pre-concentration before the prior treatment of the brine. In this case, STEP I comprises the following sub-steps:

Sub step a'1.1: This sub-step suitably comprises pre-concentration of the brine to be processed until the concentration of $Li^+$ reaches an approximate value of between about 2,000 to 3,000 mg/l. This is suitably achieved by applying any process of evaporation that uses any kind of energy.

If due to the climatic conditions of the area where the project is executed, a concentrating process through evaporation using solar evaporation ponds is chosen, the process can be carried out in natural ponds without artificial coatings. If this is not possible, ponds with an artificial coating may be used, for example impermeable plastic polymer films such as polyethylene.

Once the concentration of $Li^+$ in the brine reaches the value previously referred to, through using any process of evaporation, the brine is suitably separated from the precipitated solid, the solid is suitably washed with the same brine to be processed, and the resulting washing solution is recycled to the start of the process of pre-concentration. Precipitated solid is suitably transported to the site chosen for its final disposal.

At this point an evaluation is suitably carried out to see whether the process of pre-concentration performed is sufficient to allow the treatment of the preconcentrated brine. If the result of this evaluation is positive, the execution of the following sub-step a'1.2 is continued. If the result is negative, the process of evaporation is continued until the concentration of $Li^+$ reaches a value that ensures that lithium salts will not precipitate and that optimizes the execution of the following sub-steps.

For example, in the case of the brine of Salar del Rincón this occurs when the concentration of $Li^+$ reaches a value ranging from about 10,000 to 15,000 mg/l. At this point the preconcentrated brine is separated from the precipitated solid, the solid is washed with the same brine to be processed, and the resulting washing solution is recycled to the beginning of the process of pre-concentration.

Depending on the purity of the precipitated solid thus obtained, which in turn depends on the content of impurities present in the brine used as the initial raw material, the precipitated solid can be fed, for example, to a plant for obtaining potassium salts, as is the case with the brine of Salar del Rincön.

Figure 5:
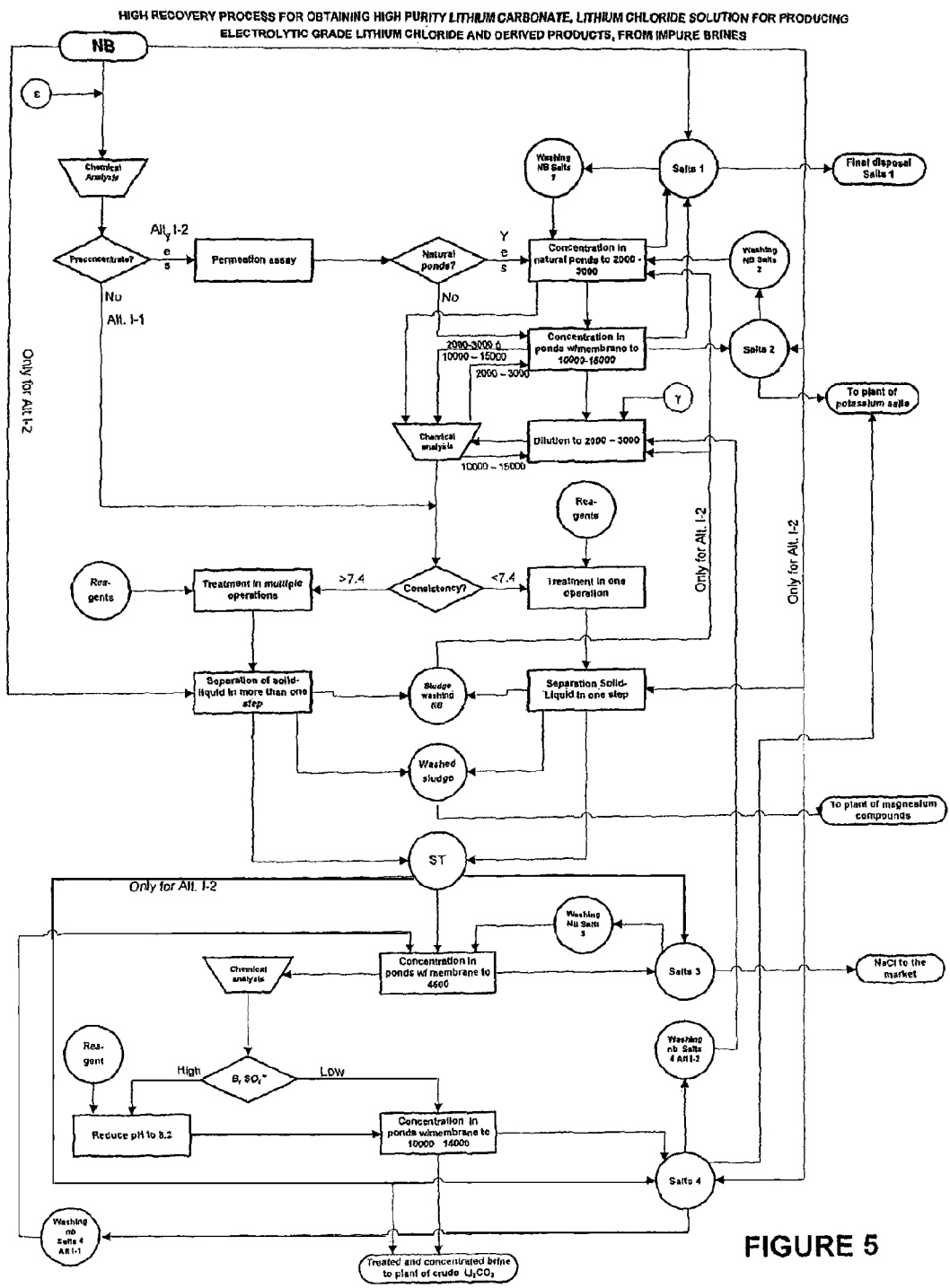
FIG. 5 is a flow diagram of a preferred embodiment of the present invention corresponding to Step I for producing a treated and concentrated brine.
Figure 6:
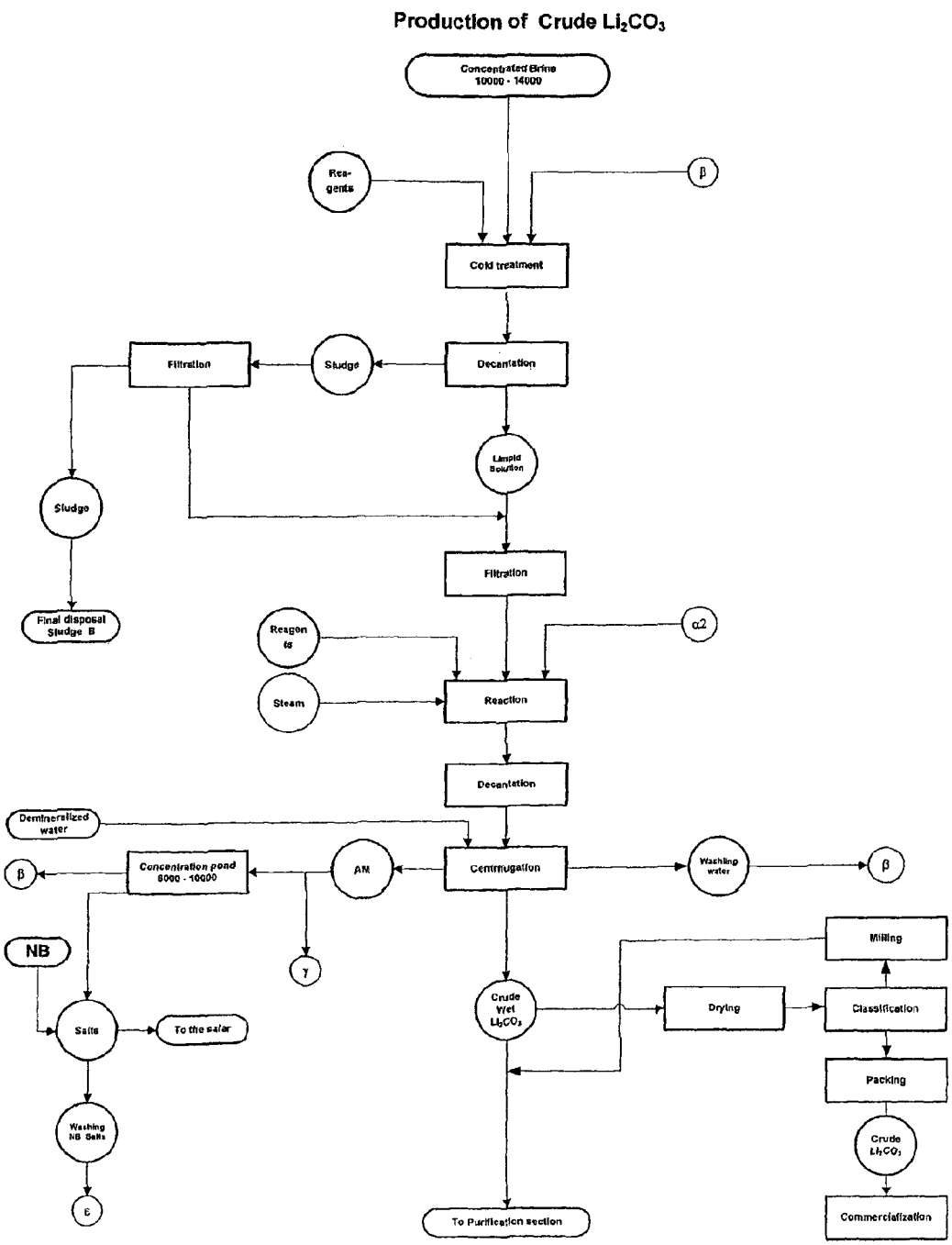
FIG. 6 is a flow diagram of a preferred embodiment of the present invention corresponding to Step II for producing crude lithium carbonate.

When analyzing the content of impurities of the preconcentrated brine obtained, the results allow the estimation of the solids content that the resulting mixture will have after treatment, and will allow a decision at this point whether a dilution process is necessary before starting treatment of the preconcentrated brine. If necessary, as shown in FIGS. 5 and 6, the preconcentrated brine may be diluted by mixing it with a suitable amount of solution identified by the Greek letter gamma γ, which is the mother liquor obtained in the process of precipitation of crude lithium carbonate. The amount of solution γ required is one that ensures the proper execution of sub-step a'1.3.

Sub-step a'1.2: Lime is suitably added to the preconcentrated brine solution taking the pH to a level of no less than about 11.3 precipitating a waste solid and forming a reaction slurry.

This sub-step is performed to remove impurities in the preconcentrated brine. If in sub-step a'1.1 the dilution process with solution γ is not performed, the impurities in the preconcentrated brine in this sub-step are removed by converting components such as magnesium, calcium, sulphate, boron and bicarbonate into magnesium hydroxide, dehydrated calcium sulphate (gypsum) of the formula $CaSO_4.2H_2O$, hydrated calcium borate of the formula $CaB_2O_4.6H_2O$ and calcium carbonate, respectively.

This sub-step can be performed in one or a succession of multiple operations, depending on the amount of insoluble substances obtained during the treatment of the brine.

If in sub-step a'1.1 the dilution process with solution γ is performed, boron can also be removed in the final concentrating step as borate with the formula $2CaO.3B_2O_3.13H_2O$.

Sub-step a'1.3: Additionally, and if needed, the concentration of $Ca^{2+}$ in the reaction slurry is adjusted.

The same considerations made for the alternative Alt I-1 above are also valid in this case.

Sub-step a'1.4: Additionally, and if needed, the pH of the reaction slurry is adjusted to a value of no less than about 11.3 by adding an effective amount of an aqueous basic solution;

The same considerations made for the alternative Alt I-1 above are also valid in this case.

Sub-step a'1.5: Optionally, a flocculant solution is added to the reaction slurry to facilitate the separation of waste solids from the processed brine solution.

The same considerations made for the alternative Alt I-1 above are also valid in this case.

Sub step a'1.6: This sub-step comprises separating the solid phase by applying any process of solid-liquid separation such as decantation, filtration and the use of a centrifuge. Depending on how sub-step a'1.2 is carried out, this sub-step can also be carried out in one or multiple operations, depending on the quantity of insoluble substances obtained during the treatment of the preconcentrated brine.

The solids or sludges obtained are washed with the brine used as the initial raw material and, depending on the composition of this sludge, can be fed to a plant for obtaining magnesium compounds, as is the case of the brine of Salar del Rincön. If in sub-step a'1.1 the dilution process with solution γ is not performed, the brine obtained in this sub-step may be used for producing crude lithium carbonate.

When in sub-step a'1.1 the dilution process with solution γ is carried out, execution of sub-steps a'1.2 and a'1.3 are suitably performed to:

Convert impurities of magnesium, calcium, sulphate, boron and bicarbonate into magnesium hydroxide, dehydrated calcium sulphate (gypsum) of the formula $CaSO_4.2H_2O$, hydrated calcium borate of the formula $CaB_2O_4.6H_2O$ and/or borate with the formula $2CaO.3B_2O_3.13H_2O$, and calcium carbonate, respectively.

Adjust the concentration of $Ca^{++}$ ion to induce the precipitation of boron, sulphate and carbonate during the concentration process by evaporation of the preconcentrated and treated brine.

Sub-step a'2: Concentration of Treated Brine.

In this second sub-step, the brine treated in the previous step is suitably concentrated by evaporation, which may be carried out in two sub-steps, as follows:

Sub-step a'2.1: This sub-step is carried out only when in sub-step a'1.1 the dilution process with solution γ is carried out. This sub-step suitably comprises the concentration by evaporation of the preconcentrated and treated brine, until a concentration of $Li^+$ ranging from between about 4,200 to 4,800 mg/l is reached. This is suitably achieved by applying any process of evaporation that uses any kind of energy.

If necessary, precipitated solid is separated and washed with preconcentrated and treated brine and the washing water recycled to the beginning of the process of concentration by evaporation. Depending on the purity of the precipitated solid thus obtained, which in turn depends on the quantity of impurities present in the brine used as the initial raw material, the precipitated salts may be commercialized for example as sodium chloride without magnesium, as in the case with the brine of the Salar del Rincön.

Sub step a'2.2: Once the chemical composition of the concentrated brine reaches from between about 4,200 to 4,800 mg/l of $Li^+$ and, depending on the concentrations of boron and sulphate, it may suitably be determined whether it is necessary to adjust the pH to a level ranging from about 8.2 to 8.4.

Sub Step a'2.3:

The process of concentration of the preconcentrated and treated brine is suitably continued up to the point that the concentration of $Li^+$ ranges between about 10,000 to 15,000 mg/l.

Precipitated solid is suitably separated and the brine thus obtained is suitably used in the process for obtaining crude lithium carbonate. Precipitated solid is suitably washed with preconcentrated and treated brine, recycling the washing water to the start of the process of concentration by evaporation. Depending on the purity of the precipitated solid thus obtained, which in turn depends on the quantity of impurities present in the brine used as the initial raw material, the precipitated solid can be fed to a plant for obtaining potassium salts, as is the case of the brine of Salar del Rincön.

Step II: Obtaining Crude Lithium Carbonate.

Once the brine in Step I is treated and concentrated, crude lithium carbonate may be precipitated from the brine.

This process comprises recovering lithium as crude lithium carbonate from impure natural or industrial brine. Step b) consists of obtaining crude lithium carbonate from the brine concentrated in step a2), and may comprise the following sub-steps:

b1) precipitating $Ca^{2+}$ by adding an aqueous solution of sodium carbonate (or other suitable carbonate) at low temperature;

b2) adjusting the pH of the brine to a value ranging from about 10.5 to 10.8;

b3) separating the precipitated $CaCO_3$;

b4) diluting the brine with fresh water and/or with mother liquor recycled from a process of precipitation of lithium carbonate (α2) to a $Li^+$ concentration ranging from about 8,000 to 9,000 mg/l;

b5) precipitating crude lithium carbonate by adding an aqueous solution of sodium carbonate (or other carbonate) and heating the mixture to a temperature above about 92° C.;

b6) separating the precipitated crude $Li_2CO_3$ solid;

b7) washing the crude lithium carbonate solid by resuspending in hot fresh water; and b8) separating the $Li_2CO_3$ washed solid.

It is preferable that the aqueous solution of sodium carbonate in step b5) is at a temperature ranging between about 30° C. to 35° C.

It is preferable that the separation of the precipitated crude lithium carbonate referred to in step b6) is carried out utilizing a centrifuge.

It is preferable that the hot freshwater referred to in step b7) is at a temperature above about 92° C.

It is preferable that that the separation of washed crude lithium carbonate referred to in step b8) is carried out utilizing a centrifuge.

Step III: Purification of Crude Lithium Carbonate.

Obtaining High Purity or Purified Lithium Carbonate, by Acid Dissolution.

In order to purify the crude lithium carbonate obtained in the second step of the process of this invention, for the purposes of obtaining high purity lithium carbonate, the crude lithium carbonate is suitably redissolved with pure water and a strong acid of sufficient quantity to produce a solution with a Li$^+$ concentration of about 8,000 to 9,000 mg/l.

The crude lithium carbonate is suitably resuspended in pure water and the acid is added slowly and under constant agitation. In this way the violence of the reaction is tempered and associated losses are minimized.

The amount of acid required is related to the reaction's stoichiometry. A small amount of excess acid may be required, and, therefore, the pH should suitably be regulated at a later stage by suitably using NaOH in solution so that it suitably ranges between about 10.5 to 11.0.

The resulting solution is suitably filtered and the insolubles obtained from this process are suitably separated by any known separation method, for example decantation, use of a centrifuge, filtration and/or micro filtration. The separated insoluble material is suitably sent to the final disposal site.

This operation is followed by reprecipitating lithium carbonate by suitably adding a saturated solution of sodium carbonate (Na$_2$CO$_3$) whilst agitating and at a temperature above about 92° C.

Purified lithium carbonate is then suitably separated by any known separation method, for example decantation, utilizing a centrifuge, and/or filtration.

The mother liquor from the process for obtaining purified lithium carbonate may be recycled to the dilution process in the reactor used for the production of crude lithium carbonate.

Thereafter separated purified lithium carbonate is suitably washed with hot pure water and separated by any known separation method, for example decantation, using a centrifuge, and/or filtration. The washing water is suitably recycled to the beginning of the purification process.

It is preferable that the purified lithium carbonate has a purity higher than 99.0% w/w.

It is preferable that the process for purifying crude lithium carbonate by acid dissolution comprises the sub-steps of:

d-1) dissolving the crude lithium carbonate in order to obtain a solution with a concentration of Li$^+$ of no less than 8,000 mg/l;

d-2) precipitating purified lithium carbonate by adding a hot aqueous solution of sodium carbonate or other carbonate and heating the mixture to a temperature above about 92° C.;

d-3) separating the precipitated Li$_2$CO$_3$;

d-4) washing the purified lithium carbonate by resuspending in hot fresh water d-5) separating the washed Li$_2$CO$_3$; and d-6) drying the purified lithium carbonate.

The dissolution of crude lithium carbonate in step d-1) is suitably executed by adding a mineral acid, preferably sulfuric acid or hydrochloric acid.

It is preferable that the aqueous solution of hot sodium carbonate in step d-2) is at a temperature ranging between about 30° C. to 35° C.

It is preferable that the separation of precipitated purified lithium carbonate in step d-3) is carried out using a centrifuge.

It is preferable that hot fresh water in step d-4) is at a temperature above about 92° C.

It is preferable that, the separation of the washed purified lithium carbonate in step d-5) is carried using a centrifuge.

It is preferable that the drying of the purified lithium carbonate in step d-6) is carried out at a temperature of about 130 to 135° C.

Obtaining High Purity or Purified Lithium Carbonate, by Carbonation (Adding CO$_2$ to an Aqueous Suspension).

One of the purification processes used to obtain high purity lithium carbonate comprises the carbonation of the crude lithium carbonate suspended in water, that is adding carbon dioxide to the crude lithium carbonate suspended in water. From this reaction, lithium bicarbonate, which is a compound soluble in water at room temperature, is obtained. The reaction involved in the process is as follows:

$$Li_2CO_3 + CO_2 + H_2O \rightarrow 2LiHCO_3 \; (*)$$

Figure 7:
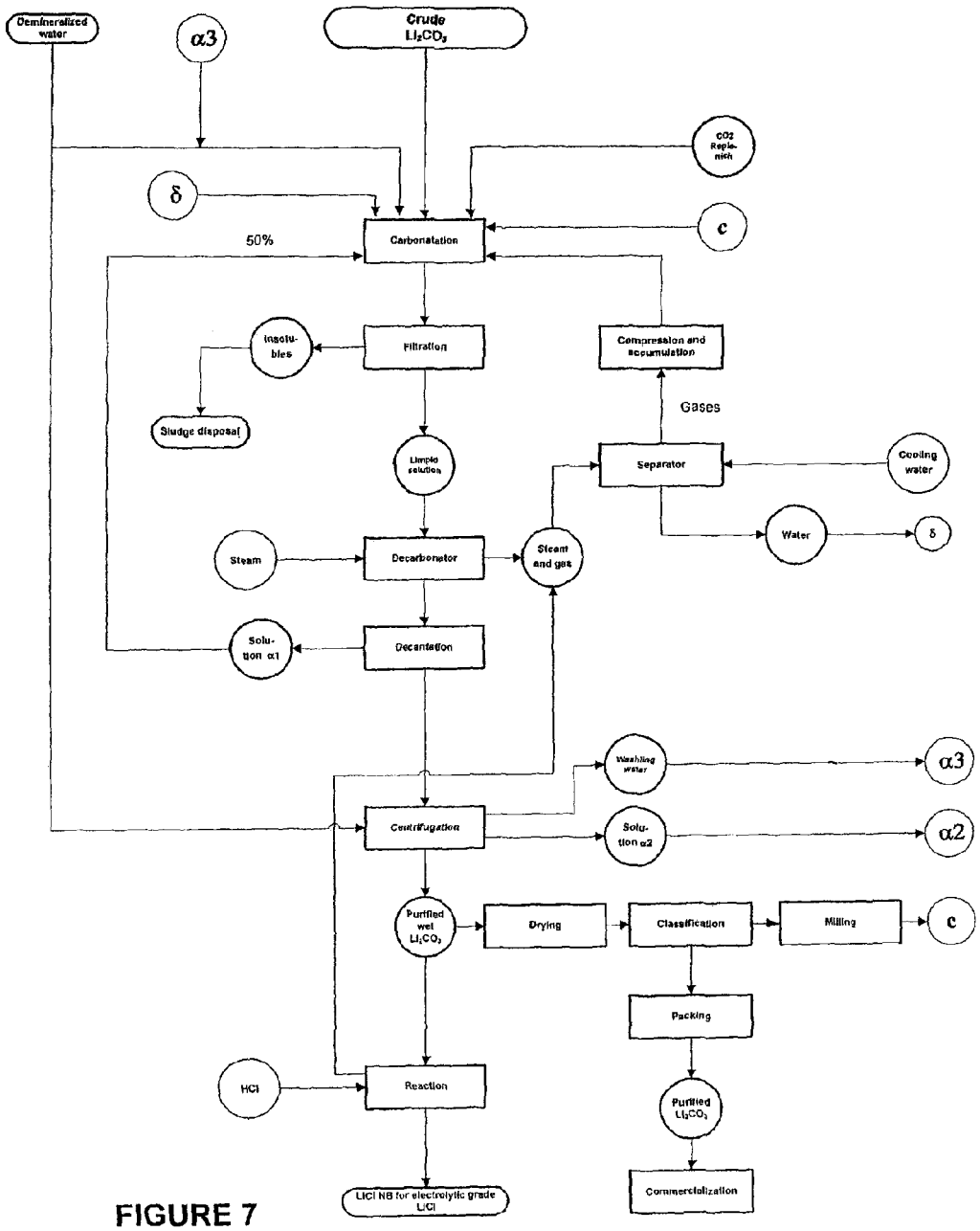
FIG. 7 is a flow diagram of a preferred embodiment of the present invention corresponding to Step III for producing purified lithium carbonate and a solution of lithium chloride for obtaining electrolytic grade lithium chloride.
Figure 8:
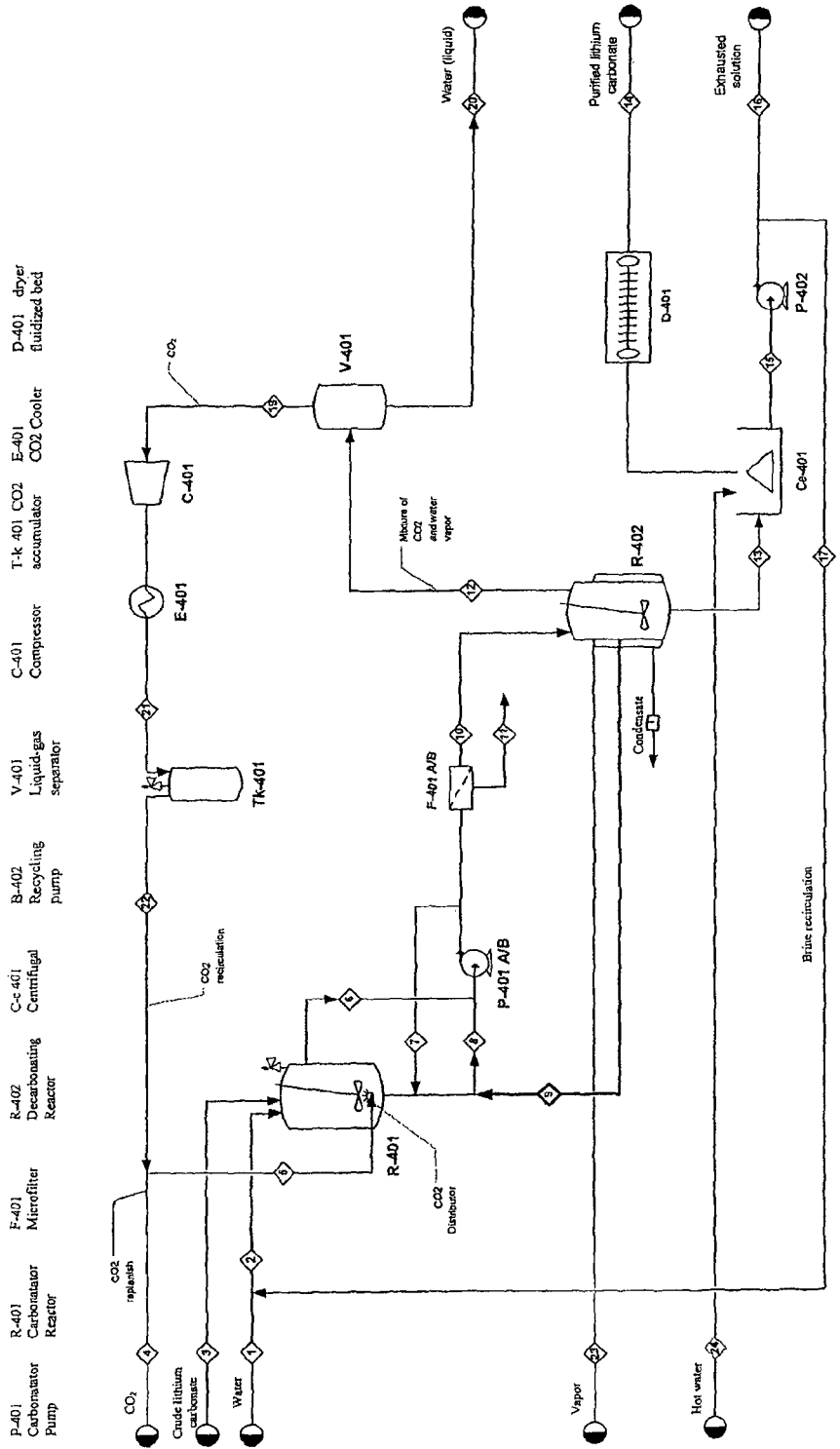
FIG. 8 is a schematic detail of the purification stage of the crude lithium carbonate by a carbonation process.

Crude lithium carbonate is suitably suspended in water. CO$_2$ is injected into a suspension of crude lithium carbonate in water, under sufficient pressure so as to attain a continuous bubbling, at room temperature, for a sufficient period of time to allow the dissolution of crude lithium carbonate. It is preferable that the water used is a mixture of soft water and water obtained from the recycling of water from the washing process ($\alpha$3), as shown in FIG. 7.

The insolubles resulting from this process are suitably separated by any known separation method, for example decantation, using a centrifuge, filtration and/or micro filtration.

The separated insoluble material is suitably sent to the final disposal site.

The liquid phase containing lithium bicarbonate is suitably sent to a reactor where it is kept under agitation, at atmospheric pressure and at a temperature above about 90° C. Under these conditions, the previous reaction (*) is reversed and the lithium bicarbonate becomes lithium carbonate.

The pure lithium carbonate is suitably separated by any known separation method, for example decantation, using a centrifuge, and/or filtration.

The mother liquor from the process for obtaining purified lithium carbonate is suitably recycled to the dilution process in the reactor for the production of crude lithium carbonate.

Thereafter, the separated purified lithium carbonate is suitably washed with hot pure water and is separated by any known separation method, for example decantation, using a centrifuge, and/or filtration. The washing water ($\alpha$3) is suitably recycled to the beginning of the purification process.

It is preferable that the purified lithium carbonate has a purity higher than 99.0% w/w.

Consequently, it is preferable that the process for purifying crude lithium carbonate by carbonation (adding CO$_2$ to an aqueous suspension) comprises the following sub-steps:

d'-1) suspending the crude lithium carbonate in water;

d'-2) injecting CO$_2$ under sufficient pressure so as to attain a continuous bubbling and at room temperature;

d'-3) filtering the insolubles;

d'-4) precipitating purified lithium carbonate whilst continuing to agitate the resulting solution at atmospheric pressure and at a temperature above about 90° C.;

d'-5) separating the precipitated purified Li$_2$CO$_3$;

d'-6) washing the purified Li$_2$CO$_3$ by resuspending in hot fresh water);

d'-7) separating the washed Li$_2$CO$_3$;

d'-8) drying the purified lithium carbonate.

It is preferable that the separation of precipitated purified lithium carbonate resulting from step d'-5) is carried out by decantation, suitably utilizing a centrifuge or filtration. Further, it is most preferable that the separation is carried out utilizing a centrifuge, and the mother liquor is recycled to the dilution process in the reactor for the production of crude lithium carbonate.

It is preferable that hot fresh water from step d'-6) is at a temperature above about 92° C.

It is preferable that the separation of washed purified lithium carbonate resulting from step d'-6) is carried out by decantation, using a centrifuge or filtration. Further, it is most preferable that the separation is carried out utilizing a centrifuge, and the washing water (α3) is recycled to the beginning of the crude lithium carbonate purification process.

It is preferable that the drying of lithium carbonate in step d'-8) is performed at a temperature of about 130 to 135° C.

Preparation of a Solution of Lithium Chloride for Producing Electrolytic Grade Lithium Chloride.

The purified lithium carbonate obtained from crude lithium carbonate obtained by any of the above-described methods, is an adequate starting material for preparing a solution of lithium chloride (LiCl) suitable for obtaining electrolytic grade lithium chloride.

This preparation involves suspending purified $Li_2CO_3$ suitably in hydrochloric acid (HCl), thus producing LiCl, water and carbon dioxide ($CO_2$), which is released to the atmosphere.

Purified lithium carbonate is suitably resuspended in pure water and the acid is added slowly and under constant agitation. In this way, the violence of the reaction is tempered and associated losses are minimized. The chemical reaction involved is as follows:

$$Li_2CO_3 + 2\ HCl \rightarrow 2\ LiCl + CO_2 + H_2O$$

It is preferable that the concentration of HCl ranges between about 32 to 35% and it is added at room temperature in sufficient quantities to achieve $Li^+$ concentration of no less than about 50 g/l in the final solution.

Under these conditions a solution of lithium chloride is obtained from which it is possible to obtain high purity or electrolytic grade LiCl.

Consequently, it is preferred that the process for obtaining a solution of lithium chloride, suitable for obtaining electrolytic grade lithium chloride, from purified lithium carbonate obtained by the above-described processes, comprises:
i) mixing purified $Li_2CO_3$ with a sufficient amount of water; and
ii) whilst constantly agitating the solution, slowly adding a solution of HCl in sufficient quantity to attain a $Li^+$ concentration of no less than about 50 g/l.

The purified $Li_2CO_3$ used as the starting material suitably has a purity above 99% w/w.

It is preferable that the HCl is at about 32% w/w. The HCl suitably has a low impurity content so that the final product is not contaminated.

It is preferable that the lithium chloride solution obtained comprises about 22.02% w/w of $Cl^-$ and about 4.31% w/w of $Li^+$.

Unexpectedly, it has been observed that by applying the above described complete process utilizing as a starting point an impure natural or industrial brine, and ultimately producing high purity lithium carbonate or a solution of lithium chloride obtained from high purity lithium carbonate, it is possible to recover from about 70% to 75% w/w of the lithium content in the brine used as raw material.

The high lithium recovery obtained in this process is the integral result of the yields of each and every step described previously, including the lithium recovered from water and solutions emanating at each sub-step and recycled.

The present invention will be better understood from the following specific examples, which are merely illustrative and are not intended to limit in any way the scope of this invention.

EXAMPLES

Example 1

Preparation of a Mixture of Calcium Hydroxide and Natural Brine Solution ($Ca(OH)_2$) 75 $Kg/m^3$ of NB)

To a natural brine solution (184.6 $dm^3$), 13.846 Kg of slaked lime ($Ca(OH)_2$) was added. The resulting mixture was agitated to form a suspension of calcium hydroxide in natural brine (75 $Kg/m^3$ of natural brine).

Example 2

Preparation of Sodium Sulphate ($Na_2SO_4$) solution, 233 $Kg/m^3$

To fresh water (46.154 $dm^3$), 10.789 Kg of solid sodium sulphate ($Na_2SO_4$) was added, with the solution being heated by applying a stream of steam (3-4 $Kg/cm^3$, 0.75 Kg) to produce a sodium sulphate solution (233 $Kg/m^3$ of fresh water).

Example 3

Preparation of a Sodium Hydroxide (NaOH) Solution, 49 $Kg/m^3$ of NB

To a natural brine solution (30.8 $dm^3$), 1.538 Kg of solid sodium hydroxide (NaOH) was added and dissolved to form a sodium hydroxide solution (in brine)(49 $Kg/m^3$ of natural brine).

Example 4

Preparation of Flocculant Solution (1.67 $Kg/m^3$ of Fresh Water)

To fresh water (23.077 $dm^3$), 0.0384 Kg of flocculant, Praestol 2515 which is a copolymer of acrylamide and sodium acrylate, was added and agitated to form a flocculant solution (1.67 $Kg/m^3$ of fresh water). Other equivalent anionic polymeric flocculants may also be used in the application of this invention.

Example 5

Preparation of One-Batch of Processed Natural Brine (PNB)

A natural brine solution (0.7846 $m^3$)(1) containing lithium and various dissolved ionic impurities was treated with a mixture of calcium hydroxide $Ca(OH)_2$ (2), the same as that prepared in Example 1. Subsequent to this first step, the natural brine solution was treated with a solution of $Na_2SO_4$ (0.050 $m^3$ of a 233 $Kg/m^3$ solution (3), and finally, was treated with NaOH solution, as prepared in Example 3 (4). Also, a flocculant solution was added to the reactor to aid in the separation of the processed brine (5) from the waste slurry (6). Waste slurry was processed in a liquid/solid separator (7) using a centrifuge to separate out the sludge (8) and recovered processed brine (9), which was added to the processed brine (10). The combined processed brine fraction has significantly lower concentrations of $Mg^{2+}$, $Ca^{2+}$, $K^+$, $Na^+$, $B_4O_7^{2-}$, $SO_4^{2-}$ and $Cl^-$ ions in solution, whilst retaining substantially the same concentration of $Li^+$ ions in solution as the natural brine starting material. Number references correspond to FIG. 2.

Example 6

Preparation of Processed Natural Brine (PNB) by Sequential Addition of Reagents

A natural brine solution (NB) (0.7846 $dm^3$) containing lithium carbonate and various ion impurities was treated with a mixture of $Ca(OH)_2$ and natural brine (as prepared in Example 1) and the solution was agitated for approximately 1 hour. The resultant slurry was then dosed with a $Na_2SO_4$ solution (0.050 m³ of a 233 Kg/m³ solution), while vigorously agitating the slurry. Finally, once the treatment with $NaSO_4$ was finished, NaOH solution (as per Example 3) was added to maintain the pH of the slurry to at least 11.3. At the end of the experiment, the processed natural brine (PNB) solution was separated from the waste slurry.

In the following analysis of the PNB solution, it was found that there was a loss of lithium of 90.54 g/m³ of natural brine, or an overall lithium recovery of 77%. In order to improve the yield of lithium recovery, a centrifuge was utilized to separate out the insoluble impurities within the slurry from the lithium containing solution, in order to produce recovered processed natural brine and the waste sludge. The analysis of the combined processed natural brine and the recovered processed natural brine indicated that there was an overall loss of lithium of 35.334 g/m³ of NB, or an overall lithium recovery of 91%, compared with the analysis of the original natural brine. The composition of the processed natural brine and waste sludge is presented in Table 3.

It was found that the sequential addition of the reagents resulted in a better overall lithium recovery than the method described in Example 5.

Example 7

Preparation of Processed Natural Brine (PNB) with the Addition of Flocculant The procedure detailed in Example 6 was repeated except that a flocculant solution containing an anionic polymer was added to the brine solution. It was found that the addition of the flocculant improved the overall efficiency of the process, by improving the separation characteristics of the solid/liquid phases.

Example 8

Determination of Required Volume of the Mixture of $Ca(OH)_2$ and Natural Brine The procedure detailed in Example 6 was repeated except that during the addition of the mixture of $Ca(OH)_2$ and natural brine, the pH was monitored at intervals of ten minutes during the agitation step. If the pH value of the mixture was equal to or higher than 11.3, measured at 23° C., agitation was continued for a further ten minutes. If the pH value of the mixture was lower than 11.3, measured at 23° C., agitation was restarted and an additional amount of the mixture of $Ca(OH)_2$ and natural brine was added. Similarly, ten minutes after adding the additional quantity of $Ca(OH)_2$ and natural brine mixture, the pH value was measured to see if it was equal to or higher than 11.3, measured at 23° C. If necessary, the operation described for adding the additional quantity of $Ca(OH)_2$ and natural brine mixture was repeated until the pH value was equal to or higher than 11.3, measured at 23° C.

By following this procedure, it was determined that the volume of $Ca(OH)_2$ and natural brine mixture necessary to maintain the pH in the desired range corresponds to a mixture of 0.1846 m³ of natural brine and 13.845 kg of calcium hydroxide for the treatment of 0.7846 m³ of a solution of naturally occurring brine (NB).

Example 9

Preparation of Processed Natural Brine (PNB) with the Addition of Flocculant The procedure detailed in Example 6 was repeated with the exception that a flocculant solution containing 1.67 Kg/m3 of the flocculant Praestol 2515 was added. It was found that the addition of the flocculant improved the overall efficiency of the process by improving the separation characteristics of the solid/liquid phases.

Example 10

Application of the Integrated Process for Obtaining Crude Lithium Carbonate

For the application of the process for obtaining lithium carbonate, a naturally occurring brine from the Salar del Rincón, with the average composition detailed in Table 4, was used as starting raw material.

TABLE 4

| Average chemical composition of naturally occurring brine. | |
|---|---|
| Component | Concentration (mg/l) |
| $Li^+$ | 394 |
| $Mg^{++}$ | 4,200 |
| $K^+$ | 7,927 |
| $Na^+$ | 114,903 |
| $Ca^{++}$ | 1,100 |
| $Cl^-$ | 195,067 |
| $SO_4^-$ | 7,300 |
| B | 413 |
| $HCO_3^-$ | 386 |

The Example was verified using a discontinuous batch process, utilizing a total of 464 batches, of 65 m³ per batch, and following the previously detailed steps, which were:
a1) First Step: Treatment of the Brine
1) Reduction of Magnesium Concentration The treatment was conducted in a cylindrical reactor equipped with agitators capable of processing 65 m³ per batch. An average of 900 kg of slacked lime was added to each batch of brine, in the form of slurry, and mixed with the brine at a ratio of 75 kg of lime/m³ of brine. This operation was carried out under intense agitation that was maintained for a period of about 10 minutes. After that period, the pH and the concentration of $Mg^{2+}$ were monitored. The required values defined for these variables were pH≥11.3 and $Mg^{2+}$≤5 mg/l. In the event that these values were not attained, the amount of lime added was increased by about 3%.
2) Reduction of Calcium and Impurities such as Sulphate, Boron, Bicarbonate.

An average amount of 750 kg of sodium sulphate mineral (with a sodium sulphate content of 58%) dissolved in water was added, an amount that was estimated based on the concentration of calcium necessary to remove the impurities present. The liquid was separated from the solid product of precipitation through a process of decantation. The liquid was sent to evaporation ponds ($2^{nd}$ step) and the solid to the sludge ponds, where it was left to decant to obtain a higher amount of Treated Natural Brine.

3) pH Regulation to a Value Equal to or Higher than 11.3 Effected with NaOH.
4) To Aid in the Separation, the Flocculant Praestol 2515 in Aqueous Solution was Added, and the Solid Phase was Separated from the Liquid Phase.

a2) Second Step: Concentration of the Treated Brine

1) The concentration by evaporation of the impurity free treated brine, was carried out in three ponds of different dimensions. Filling of the first pond started with the transfer of the liquid phase of the first batch, and continued successively for a period of three and a half months. Transfer to other evaporation ponds of smaller dimensions was necessary due to the volume decrease resulting from water evaporation, as at the same time different salts precipitate out while the concentration of lithium increases.

The evolution of the process was monitored by weekly analysis of the liquid phase composition, wherein the concentration of $Li^+$, $Na^+$, $K^+$, $Ca^{++}$, $Mg^{++}$, $Cl^-$, $SO_4^=$ and B was determined. In each of the samples the pH of the solution was also measured.

When the concentration of $Li^+$ in a pond reached a value of 4,006 mg/l at a pH=9.9, the pH was reduced to 8.12 by the addition of 400 $dm^3$ (l) of 36% hydrochloric acid.

2) Increase of the concentration of lithium. The process of evaporation continued until the chemical analysis of the brine indicated a concentration of lithium equal to 9,800 mg/l in the pond.

This value corresponds to the concentration after washing the crystals and diluting the Concentrated Treated Natural Brine with recycled washing water. From the beginning of this step until the concentration of lithium was attained, seven months elapsed.

b) Second Step: Obtaining Crude Lithium Carbonate.

For obtaining lithium carbonate, 550 $dm^3$ (l) of treated brine with the following composition was used:

TABLE 5

Composition of treated brine.

| Component | Concentration (mg/l) |
| --- | --- |
| $Li^+$ | 9,800 |
| $Mg^{++}$ | Not detected |
| $Ca^{++}$ | 2,800 |
| $SO_4^-$ | 3,210 |
| B | 2,282 |

In order to obtain lithium carbonate, the following operations were carried out:

1) Separation of impurities was facilitated by pH regulation, which in turn was effected by the addition of NaOH in aqueous solution to attain a pH value equal to 11. In order to reduce the concentration of $Ca^{2+}$ ions a saturated solution of sodium carbonate in a stoichiometrically determined quantity was used. The operation was performed at room temperature, which in the region where it was carried out was about 10° C. During the treatment, impurities were precipitated out and separated by decantation and later filtration.

2) Precipitation of lithium carbonate was carried out by adding $Na_2CO_3$ saturated solution, in dosage related to the lithium content. The addition of the $Na_2CO_3$ saturated solution was carried out in a reactor under continuous agitation, and prior heating of the brine to a temperature above about 92° C. The solution was kept under these conditions for about 40 minutes. Once the operation was completed, the hot solution was filtered.

As a result of these operations 25.9 kg of crude $Li_2CO_3$ with a purity of 96.5% was obtained.

3) In order to purify the product and remove the remaining impurities, a portion of the solid was washed with hot water. The product was dried at 130° C. Through this operation, the purity of the lithium carbonate was increased to 98.7%.

The product obtained had the following composition:

TABLE 6

Composition of crude lithium carbonate product

| Component | % by weight |
| --- | --- |
| $Li^+$ | 18.55 |
| $Mg^{2+}$ | 0.003 |
| $K^+$ | 0.011 |
| $Na^+$ | 0.207 |
| $Ca^{2+}$ | 0.092 |
| $Cl^-$ | 0.153 |
| $SO_4^{2-}$ | 0.030 |
| B | 0.006 |
| $CO_3^{2-}$ | 80.22 |

Example 11

Application of the Integrated Process for Obtaining Lithium Carbonate a1) First Step: Treatment of the Brine to be Processed: Alternative with Pre-Concentration (a'1) of the Brine.

This alternative was carried out so that during the process of pre-concentration the amount of insolubles obtained by later treatment of the brine is reduced. Therefore, during the process of pre-concentration the evolution of the chemical composition of the brine is monitored.

a1') The Process of Pre-Concentration of Brine was Applied on a Naturally Occurring Brine with the Following Composition:

TABLE 7

Chemical composition of the naturally occurring brine

| Component | Concentration (mg/l)<br>Natural Brine |
| --- | --- |
| $Li^+$ | 406 |
| $Mg^{++}$ | 3,741 |
| $K^+$ | 7,661 |
| $Na^+$ | 115,077 |
| $Ca^{++}$ | 869 |
| $Cl^-$ | 195,960 |
| $SO_4^=$ | 8,654 |
| B | 374 |

The process of pre-concentration was performed in ponds with impermeable high density polyethylene membrane. The process required a period of three months.

During this period the chemical composition of the brine was monitored on a weekly basis and it was decided to stop the process of evaporation when the $Li^+$ present reached a concentration equal to 11,118 mg/l.

At this point, and after separating and washing the precipitated salts with naturally occurring brine, concentrated brine was diluted with naturally occurring brine of a chemical composition similar to that used as the raw material of the process, and the resulting composition was as follows:

TABLE 8

Chemical composition of preconcentrated and diluted brine.

| Component | Concentration (mg/l) Concentrated Brine | Concentration (mg/l) Diluted Brine |
|---|---|---|
| $Li^+$ | 11,118 | 2,182 |
| $Mg^{++}$ | 58,583 | 12,884 |
| $K^+$ | 17,233 | 8,285 |
| $Na^+$ | 10,408 | 94,701 |
| $Ca^{++}$ | 75 | 602 |
| $Cl^-$ | 246,015 | 194,658 |
| $SO_4^=$ | 52,400 | 15,721 |
| B | 10,409 | 2,079 |

Based on the impurities present in the concentrated brine, the solids content of the mixture resulting from the treatment was estimated. The calculation resulted in a consistency equal to 7%, so it was possible to execute the separation in only one operation. Once dilution was completed, batches (each of a volume of 65 m³) of the diluted brine obtained were taken and were subjected to chemical treatment to transform impurities such as $Mg^{++}$, $Ca^{++}$, $SO_4^=$, B and $HCO_3^-$ into $Mg(OH)_2$, $Ca(SO_4)_2.2H_2O$, $CaB_2O_4.6H_2O$ and $CaCO_3$.

Removal of $Mg^{++}$ was carried out using 560 kg of lime in the form of a slurry dissolved in a proportion of 75 kg of lime/m³ of brine, acting as a precipitating reagent.

Later, the content of $Ca^{++}$ necessary for removal of the other components was regulated by the addition of 490 kg of mineral $Na_2SO_4$ (purity 58%) and the pH was adjusted to 11.4 with NaOH. Separation of the solid and liquid phases was conducted by accelerated decantation with the flocculant Praestol 2515 in aqueous solution.

Separation of the solid phase was performed by filtration, and the chemical composition of the resulting liquid phase was as follows:

TABLE 9

Chemical composition of the resulting liquid phase

| Component | Concentration (mg/l) of the solution obtained |
|---|---|
| $Li^+$ | 1,946 |
| $Mg^{++}$ | <1 |
| $K^+$ | 9,151 |
| $Na^+$ | 80,424 |
| $Ca^{++}$ | 2,471 |
| $Cl^-$ | 201,338 |
| $SO_4^=$ | 1,753 |
| B | 1,343 | a2) First Step: Concentration of the Treated Brine

The final concentration of the resulting treated brine was performed in ponds with membranes until it reached a $Li^+$ concentration equal to 11,446 mg/l.

b) Second Step: Obtaining Crude Lithium Carbonate.

In order to obtain crude lithium carbonate, 4,000 liters of treated and concentrated brine of the following composition were processed.

TABLE 10

Chemical composition of the treated and concentrated brine

| Component | Concentration (mg/l) |
|---|---|
| $Li^+$ | 11,446 |
| $Mg^{++}$ | Not detected |

TABLE 10-continued

Chemical composition of the treated and concentrated brine

| Component | Concentration (mg/l) |
|---|---|
| $Ca^{++}$ | 4,181 |
| $SO_4^=$ | 2,378 |
| B | 2,073 |

A cold treatment was applied to the brine, consisting of adding a saturated solution of sodium carbonate in a stoichiometrically determined quantity related to the content of calcium. The operation was performed at room temperature which, in the operation area of the Salar del Rincón was about 10° C. Impurities precipitated with this treatment were separated by decantation and later filtration.

To precipitate out the lithium carbonate, a saturated $Na_2CO_3$ solution was added, in doses related to the lithium content. The addition of this $Na_2CO_3$ solution was carried out in a reactor under continuous agitation, and prior heating of the brine to a temperature above about 92° C. The solution was kept under these conditions for about 40 minutes.

Later, the liquid was separated from the solid by decantation and the use of a centrifuge, recycling the mother liquor as shown in FIGS. 5 and 6.

From these operations 150 kg of crude, washed and dry $Li_2CO_3$ with the following composition were obtained:

TABLE 11

Composition of crude lithium carbonate product

| Component | % by weight |
|---|---|
| $Li_2CO_3$ | 98.37 |
| $Mg^{++}$ | 0.004 |
| $K^+$ | 0.16 |
| $Na^+$ | 0.40 |
| $Ca^{++}$ | 0.033 |
| $Cl^-$ | 0.40 |
| $SO_4^=$ | 0.46 |
| B | 0.0041 |
| $Fe_2O_3$ | 0.0026 |
| Insolubles | 0.09 |
| Loss at 500° C. | 0.73 |
| Moisture | <0.2 |

Example 12

Obtaining High Purity or Purified Lithium Carbonate: Obtaining High Purity or Purified Lithium Carbonate by Acid Dissolution Crude lithium carbonate with the following typical composition was used:

TABLE 12

Composition of crude lithium carbonate to be purified

| Component | % by weight |
|---|---|
| $Li_2CO_3$ | 97.85 |
| $Mg^{++}$ | 0.003 |
| $K^+$ | 0.077 |
| $Na^+$ | 0.18 |
| $Ca^{++}$ | 0.038 |
| $Cl^-$ | 0.092 |
| $SO_4^=$ | 0.656 |

TABLE 12-continued

Composition of crude lithium carbonate to be purified

| Component | % by weight |
|---|---|
| B | 0.052 |
| $Fe_2O_3$ | 0.0025 |

Pure water (in sufficient quantities to minimize projected losses during reaction) was added to samples of 40 kg of crude lithium carbonate. Hydrochloric acid (32% w/w) was then added in sufficient quantities, under agitation, to obtain a solution with a $Li^+$ concentration of about 9,000 mg/l. The ratio of the acid added corresponded to the reaction stoichiometry. The pH of this mixture was regulated to a level of between about 10.5 to 11 by using NaOH in solution. Later, the solution was passed through a cartridge micro filter of 5 μm. Reprecipitation of $Li_2CO_3$ was performed by adding a saturated solution of $Na_2CO_3$ whilst agitating at a temperature between 90 and 95° C.

The product was separated by using a centrifuge and washed with hot water utilizing a ratio of two times its weight, and washing water was recycled for dissolving crude lithium carbonate.

The average yield in this process was 65.0% and the average composition of the purified product was as follows:

TABLE 13

Composition of purified lithium carbonate

| Component | % by weight |
|---|---|
| $Li_2CO_3$ | 99.40 |
| $Mg^{++}$ | 0.003 |
| $K^+$ | 0.002 |
| $Na^+$ | 0.060 |
| $Ca^{++}$ | 0.031 |
| $Cl^-$ | 0.036 |
| $SO_4^{=}$ | 0.082 |
| B | 0.0009 |
| $Fe_2O_3$ | 0.0015 |
| Insolubles | 0.001 |
| Loss at 500° C. | 0.55 |
| Moisture | <0.1 |

Example 13

Application of the Integrated Process for Obtaining Lithium Carbonate: Obtaining High Purity or Purified Lithium Carbonate by Carbonation (Adding $CO_2$ to an Aqueous Suspension)

In each case, the assays were carried out by preparing a mixture of 40 kg of crude $Li_2CO_3$ in a suspension of 900 liters of soft water together with washing water (α3). To this mixture $CO_2$ was injected at sufficient pressure to produce continuous bubbling at room temperature. The period of injection was maintained for a period of about 1 h. and 15 min. Thereafter, the insoluble material was separated by filtration, in this case a "Y" shaped filter and a 5 μm cartridge micro filter were used. The insoluble material was sent to the final disposal site.

The liquid phase containing lithium bicarbonate was taken to a tank reactor, where it was continuously agitated, kept at atmospheric pressure and at 90° C. Under these conditions, the bicarbonate was converted into lithium carbonate. The mother liquor from the process of obtaining purified lithium carbonate was recycled to the dilution process in the reactor for the production of crude lithium carbonate. The product was washed with hot water at a ratio of two times its own weight and the washing water (α3) was recycled to the beginning of the purification process.

With this process an average of 25.2 kg of a purified product with the following composition was obtained:

TABLE 14

Composition of purified lithium carbonate product

| Component | % by weight |
|---|---|
| $Li_2CO_3$ | 99.60 |
| $Mg^{++}$ | 0.002 |
| $K^+$ | 0.008 |
| $Na^+$ | 0.051 |
| $Ca^{++}$ | 0.009 |
| $Cl^-$ | 0.017 |
| $SO_4^{=}$ | 0.046 |
| B | 0.0008 |
| $Fe_2O_3$ | 0.0015 |
| Insolubles | 0.001 |
| Loss at 500° C. | 0.58 |
| Moisture | <0.1 |

Example 14

Preparation of an Aqueous Solution for Obtaining Lithium Chloride for the Production of Electrolytic Grade Lithium Chloride From the purified lithium carbonate obtained in Example 12 or 13, a solution of lithium chloride suitable for obtaining electrolytic grade lithium chloride was prepared. The assays for obtaining the solution were carried out taking samples of approximately 1.0 kg of purified $Li_2CO_3$, whose average composition is detailed as follows:

TABLE 15

Average composition of purified lithium carbonate

| Component | % by weight |
|---|---|
| $Li_2CO_3$ | 99.30 |
| $Li^+$ | 18.66 |
| $Mg^{++}$ | 0.002 |
| $K^+$ | 0.005 |
| $Na^+$ | 0.058 |
| $Ca^{++}$ | 0.032 |
| $Cl^-$ | 0.036 |
| $SO_4^{=}$ | 0.050 |
| B | 0.0009 |
| $Fe_2O_3$ | 0.0015 |
| Insolubles | 0.001 |
| Loss at 500° C. | 0.58 |
| Moisture | <0.1 |

Water was added to the samples in sufficient quantity so as to avoid loss of material caused through the violence of the reaction with acid. Thereafter, slowly and whilst agitating, 32% HCl was added in sufficient quantities to achieve a $Li^+$ concentration of no less than about 50 g/l. All the assays were performed at room temperature.

Under these conditions a solution of lithium chloride with the following composition was obtained, expressed in percentage by weight:

TABLE 16

Composition of the solution of lithium chloride obtained.

| Component | % by weight |
|---|---|
| $Cl^-$ | 22.02 |
| $Li^+$ | 4.31 |
| $Mg^{++}$ | 0.001 |
| $K^+$ | 0.001 |
| $Na^+$ | 0.012 |
| $Ca^{++}$ | 0.008 |
| $SO_4^=$ | 0.012 |
| B | 0.0004 |
| $Fe_2O_3$ | 0.0003 |

From this solution of lithium chloride it is possible to obtain high purity LiCl.

INDUSTRIAL APPLICABILITY OF THE INVENTION

This invention is applicable to the field of recovering metals from brines. In particular, the invention refers to a high recovery process for the treatment of brines in an aqueous environment to obtain high purity lithium carbonate, a solution of lithium chloride for producing electrolytic grade lithium chloride and derived products. The process is performed without the use of extraction solvents, and is easy to implement near salars (brine deposits). It will primarily benefit the mining industry in relation to exploitation of brines for obtaining lithium, as well as related industries, all of which will benefit hugely by having a process for obtaining high purity lithium carbonate, a solution of lithium chloride for producing electrolytic grade lithium chloride and derived products, from brines in an aqueous environment and with a low environmental impact, whilst also providing an important economic benefit.

Final Considerations

Different modifications and variations to the process for obtaining high purity lithium carbonate, a solution of lithium chloride for producing electrolytic grade lithium chloride and products derived from brines, as described by this invention will be evident to those skilled in the art without departing from the scope and the spirit of the invention. Although the invention has been described in relation to certain specific preferred embodiments and some variations, it is understood that the invention as claimed should not be unduly limited to these specific embodiments. In fact, it is intended that the different modifications to the described steps to execute the invention which are obvious to those skilled in the art, or in related art, are included within the scope of the following claims.

In effect, the persons skilled in the art will recognize that numerous variations and/or changes can be made to the invention as shown in the specific embodiments, without departing from the scope of the invention as widely described. These embodiments should consequently be considered in all respects merely as illustrative and non-limiting.

What is claimed is:

1. A process for recovering lithium from an impure natural or industrial brine, the process comprising (a1) adjusting the pH of a feed brine containing lithium with a maximum lithium content of 15,000 mg/L to a value of no less than 11.3 and separating the waste solids and a slurry containing lithium values.

2. The process of claim 1 further comprising (a2) concentrating the brine to increase the concentration of $Li^+$ ions.

3. The process of claim 2 further comprising obtaining crude lithium carbonate from the brine by precipitating the solid by adding a soluble carbonate and separating the solid.

4. The process of claim 3 further comprising (c1) redissolving and reprecipitating the crude lithium carbonate to produce high purity lithium carbonate and separating the solid.

5. The process of claim 4 wherein the step c1) of purifying lithium carbonate comprises the sub-steps of:
   c1.1) dissolving the crude lithium carbonate to obtain a limpid solution with a concentration of $Li^+$ ranging from about 8,800 to 9,200 mg/l and filtering the insoluble impurities;
   c1.2) precipitating purified lithium carbonate by adding an aqueous solution of sodium carbonate and heating the mixture to a temperature above about 92° C.;
   c1.3) separating the precipitated $Li_2CO_3$;
   c1.4) washing the purified lithium carbonate by resuspending the purified lithium carbonate in hot fresh water;
   c1.5) separating the washed $Li_2CO_3$; and
   c1.6) drying the purified lithium carbonate.

6. The process of claim 4, wherein the step c'1) of purifying crude lithium carbonate comprises the sub-steps of:
   c'1.1) suspending the crude lithium carbonate in water;
   c'1.2) injecting $CO_2$ at a sufficient pressure to attain a continuous bubbling, at room temperature;
   c'1.3) filtering the insolubles;
   c'1.4) precipitating purified lithium carbonate while maintaining the resulting solution under agitation at atmospheric pressure and at a temperature above about 90° C.;
   c'1.5) separating the purified precipitated $Li_2CO_3$;
   c'1.6) washing the purified $Li_2CO_3$ by resuspending the purified $Li_2CO_3$ in hot fresh water;
   c'1.7) separating the washed $Li_2CO_3$; and
   c'1.8) drying the purified lithium carbonate.

7. The process of claim 3 further comprising (c2) preparing a solution of lithium chloride from the lithium carbonate.

8. The process of claim 7 further comprising:
   c2.1) mixing purified $Li_2CO_3$ with a sufficient amount of water; and
   c2.2) adding slowly and under agitation a solution of HCl in a sufficient quantity to attain a concentration of $Li^+$ of no less than 50 g/l in the solution.

9. The process of claim 3, wherein the step b) for obtaining crude lithium carbonate from the brine concentrated in the step a2) comprises the sub-steps of:
   b1) precipitating $Ca^{2+}$ by adding a sodium carbonate or other carbonate solution at low temperature;
   b2) adjusting the pH of the brine to a value ranging from about 10.5 to 10.8;
   b3) separating the precipitated $CaCO_3$;
   b4) diluting the brine with fresh water and/or with mother liquor recycled from a process of precipitation of lithium carbonate to a concentration of $Li^+$ ranging from about 8,000 to 9,000 mg/l;
   b5) precipitating lithium carbonate by adding sodium carbonate or other carbonate solution and heating the mixture to a temperature above about 92° C.;
   b6) separating the precipitated $Li_2CO_3$ solid;
   b7) washing the lithium carbonate solid by resuspending the lithium carbonate in hot fresh water; and
   b8) separating the $Li_2CO_3$ washed solid.

10. The process of claim 2 wherein in step a2) the concentration of $Li^+$ ion is increased to about 10,000 to 15,000 mg/l.

11. The process of claim 2, wherein the step a2) of concentrating by evaporation the brine processed in a1) comprises the sub-steps of:
   a2.1) concentrating the brine from step a) by evaporation to increase the concentration of $Li^+$ ions to between about 4,200 to 4,800 mg/l, and additionally separating the precipitated solids;
   a2.2) adjusting the pH of the concentrated brine in a2.1) to a value ranging from about 8.2 to 8.4; and
   a2.3) concentrating the brine from step a.2.2) to increase the concentration of $Li^+$ ions from between about 4,200 to 4,800 mg/l to between about 10,000 to 15,000 mg/l, and additionally separating the precipitated solids.

12. The process of claim 1, wherein the pH is adjusted to a value of no less than 11.3 by addition of one or more of calcium hydroxide, lime or slaked lime.

13. The process of claim 12 wherein calcium hydroxide is in the form of an aqueous mixture, and wherein the aqueous mixture is a combination of slaked lime and the brine.

14. The process of claim 1, wherein the step a1) comprises the sub-steps of:
   a1.1) adding lime, slaked lime and/or calcium hydroxide to the solution of feed brine taking the pH to a value of no less than 11.3 precipitating a waste solid and forming a slurry containing lithium values in its liquid phase;
   a1.2) if necessary, adjusting the concentration of $Ca^{2+}$ in the slurry;
   a1.3) additionally, if necessary, adjusting the pH of the slurry to a value of no less than 11.3;
   a1.4) optionally, adding a flocculant solution to the slurry to aid in the separation of waste solids from the processed brine solution; and
   a1.5) separating the waste solids precipitated from the slurry to form a processed brine solution and a waste slurry.

15. The process of claim 14 wherein when separating the waste solid in sub-step a1.1) the concentration in the slurry of:
   magnesium is reduced to less than 5 mg/l by precipitating as $Mg(OH)_2$;
   sulphate ($SO_4^{2-}$) is reduced by precipitating as $CaSO_4.2H_2O$;
   boron is reduced by precipitating as $CaB_2O_4.6H_2O$ and $2CaO.3B_2O_3.13H_2O$; and
   bicarbonate ($HCO_3^-$) and carbonate ($CO_3^{2-}$) is reduced by precipitating as $CaCO_3$.

16. The process according to claim 14, wherein the precipitation of remaining boron, sulphate and carbonate occurs during a concentration by evaporation of the brine following sub-step a1.1).

17. The process according to claim 1 wherein the concentration of $Mg^{2+}$ present in the brine decreases to a value lower than 5 mg/l.

18. The process of claim 1, wherein the feed brine is subjected to at least one step a'1) of pre-concentration before step a1).

19. The process of claim 18 wherein the step of pre-concentration is performed until the concentration of $Li^+$ reaches a value ranging from about 2,000 to 3,000 mg/l.

20. The process of claim 18 wherein the step of pre-concentration continues until the concentration of $Li^+$ reaches a value ranging from about 10,000 to 15,000 mg/l.

21. The process of claim 1 wherein lithium is recovered as high purity lithium carbonate or a solution of lithium chloride.

* * * * *